(12) United States Patent
Wisgo

(10) Patent No.: US 12,314,361 B2
(45) Date of Patent: May 27, 2025

(54) IDENTIFYING USERS BASED ON TYPING BEHAVIOR

(71) Applicant: Citrix Systems, Inc., Fort Lauderdale, FL (US)

(72) Inventor: Jeffrey David Wisgo, Portland, OR (US)

( * ) Notice: Subject to any disclaimer, the term of this patent is extended or adjusted under 35 U.S.C. 154(b) by 716 days.

(21) Appl. No.: 17/495,868

(22) Filed: Oct. 7, 2021

(65) Prior Publication Data
US 2023/0111812 A1    Apr. 13, 2023

(51) Int. Cl.
*G06F 21/32* (2013.01)
*G06F 21/31* (2013.01)
*G06F 3/023* (2006.01)

(52) U.S. Cl.
CPC ............ *G06F 21/32* (2013.01); *G06F 21/316* (2013.01); *G06F 3/0233* (2013.01)

(58) Field of Classification Search
CPC ...... G06F 21/32; G06F 21/316; G06F 3/0233; G06F 3/0227; G06F 3/023
See application file for complete search history.

(56) References Cited

U.S. PATENT DOCUMENTS

| | | | | |
|---|---|---|---|---|
| 4,805,222 A | * | 2/1989 | Young | ............... G06V 40/28 382/209 |
| 8,332,932 B2 | * | 12/2012 | Kellas-Dicks | ........ G06F 21/316 726/19 |
| 10,911,440 B2 | | 2/2021 | Brown | |
| 2008/0092209 A1 | * | 4/2008 | Davis | ..................... G06F 21/32 726/2 |
| 2016/0259924 A1 | * | 9/2016 | Dutt | ................... H04L 63/1416 |
| 2016/0359838 A1 | * | 12/2016 | Dasgupta | ............... H04L 63/08 |
| 2017/0116399 A1 | * | 4/2017 | Samzelius | .............. H04L 63/08 |
| 2019/0243955 A1 | * | 8/2019 | Rome | ...................... G06F 21/46 |
| 2022/0253511 A1 | * | 8/2022 | Popa | ................... H04L 63/0861 |

* cited by examiner

*Primary Examiner* — Han Yang

(57) ABSTRACT

In one disclosed method, a computing system determines, on a first occasion, that a first user typed a first sequence of characters including at least a first character followed by a second character, and determines first data that is based at least in part on a first time interval between first and second interactions by the first user with a keyboard while typing the first character and the second character within the first sequence of characters. On a second occasion, the computing system determines that a person typed a second, different sequence of characters including at least the first character followed by the second character, determines second data that is based at least in part on a second time interval between third and fourth interactions by the person with a keyboard while typing the first character and the second character within the second sequence of characters, and determines that the person is the first user based at least in part on the first data and the second data.

18 Claims, 13 Drawing Sheets

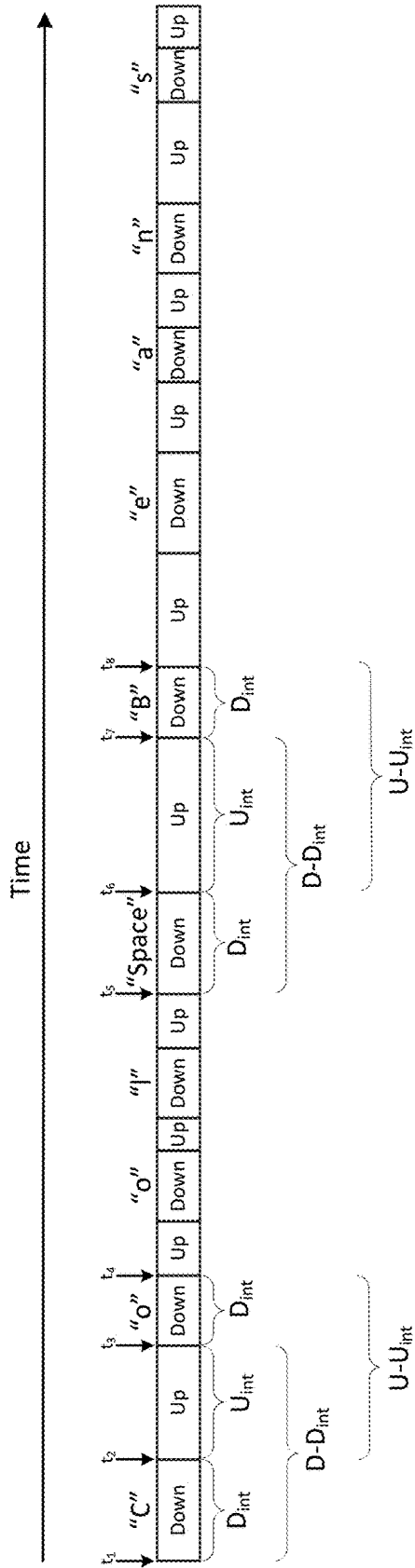

| Character-to-Character Transition | $D_{int}(1)$ | $U_{int}$ | $D_{int}(2)$ | $D\text{-}D_{int}$ | $U\text{-}U_{int}$ |
|---|---|---|---|---|---|
| C→o | $t_2-t_1$ | $t_3-t_2$ | $t_4-t_3$ | $t_3-t_1$ | $t_4-t_2$ |
| Space→B | $t_6-t_5$ | $t_7-t_6$ | $t_8-t_7$ | $t_7-t_5$ | $t_8-t_6$ |

FIG. 8

| Character-to-Character Transition | User | Context | $D_{int}(1)$ | $U_{int}$ | $D_{int}(2)$ | $D\text{-}D_{int}$ | $U\text{-}U_{int}$ |
|---|---|---|---|---|---|---|---|
| A→A | U1 | C1 | D1 | D2 | D3 | D4 | D5 |
| 9→9 | U1 | C1 | D6 | D7 | D8 | D9 | D10 |

FIG. 10

IDENTIFYING USERS BASED ON TYPING BEHAVIOR

BACKGROUND

Various systems have been developed to identify users operating client devices. For example, some systems authenticate identities of users operating client devices as a condition for enabling the client devices to access resources, such as applications, desktops, data, files, etc. Such resources may be located locally on the client device, e.g., native applications, or remote from the client device, e.g., hosted applications on servers in communication with client devices via one or more networks, such as the internet. Such user authentication is typically based on the proper entry of a user name together with a secret password, or based on a measured biometric characteristic of the user, such as a fingerprint, facial scan, or the like.

SUMMARY

This Summary is provided to introduce a selection of concepts in a simplified form that are further described below in the Detailed Description. This Summary is not intended to identify key features or essential features, nor is it intended to limit the scope of the claims included herewith.

In some of the disclosed embodiments, a method involves determining, by a computing system on a first occasion, that a first user typed a first sequence of characters including at least a first character followed by a second character; determining, by the computing system, first data that is based at least in part on a first time interval between first and second interactions by the first user with a keyboard while typing the first character and the second character within the first sequence of characters; determining, by the computing system on a second occasion, that a person typed a second sequence of characters including at least the first character followed by the second character, the second sequence of characters being different than the first sequence of characters; determining, by the computing system, second data that is based at least in part on a second time interval between third and fourth interactions by the person with a keyboard while typing the first character and the second character within the second sequence of characters; and determining, by the computing system, that the person is the first user based at least in part on the first data and the second data.

In some disclosed embodiments, a method involves determining, by a computing system, that a user typed a sequence of characters including at least a first character followed by a second character; determining, by the computing system, a duration of at least a first time interval measured based at least in part on a first time at which the user ceased pressing a first key for the first character while typing the sequence of characters; and determining, by the computing system, an identity of the user based at least in part on the duration of the first time interval.

In some disclosed embodiments, a system includes at least one processor, and at least one computer-readable medium encoded with instructions which, when executed by the at least one processor, cause the system to determine, on a first occasion, that a first user typed a first sequence of characters including at least a first character followed by a second character, to determine first data that is based at least in part on a first time interval between first and second interactions by the first user with a keyboard while typing the first character and the second character within the first sequence of characters, to determine, on a second occasion, that a person typed a second sequence of characters including at least the first character followed by the second character, the second sequence of characters being different than the first sequence of characters, to determine second data that is based at least in part on a second time interval between third and fourth interactions by the person with a keyboard while typing the first character and the second character within the second sequence of characters, and to determine that the person is the first user based at least in part on the first data and the second data.

BRIEF DESCRIPTION OF THE DRAWINGS

Objects, aspects, features, and advantages of embodiments disclosed herein will become more fully apparent from the following detailed description, the appended claims, and the accompanying figures in which like reference numerals identify similar or identical elements. Reference numerals that are introduced in the specification in association with a figure may be repeated in one or more subsequent figures without additional description in the specification in order to provide context for other features, and not every element may be labeled in every figure. The drawings are not necessarily to scale, emphasis instead being placed upon illustrating embodiments, principles and concepts. The drawings are not intended to limit the scope of the claims included herewith.

FIG. 1C illustrates various parameters that may be determined for inclusion in keystroke timing data that is obtained when a user types a sequence of characters on a keyboard;

FIG. 1D shows two example tables that may be populated with keystroke timing data for two of the character-to-character transitions indicated in the keystroke timing data of FIG. 1C;

FIG. 8 shows a table illustrating examples of keystroke timing data values that may calculated by the keystroke monitoring engine shown in FIG. 5 based on the keyboard events illustrated in FIG. 1C;

FIG. 10 shows a table illustrating examples of keystroke behavior data values that may be calculated and stored by the keystroke profile management engine (shown in FIG. 5) for respective user and contexts based on the keystroke timing data in the tables shown in FIG. 1D;

DETAILED DESCRIPTION

Figure 1A:
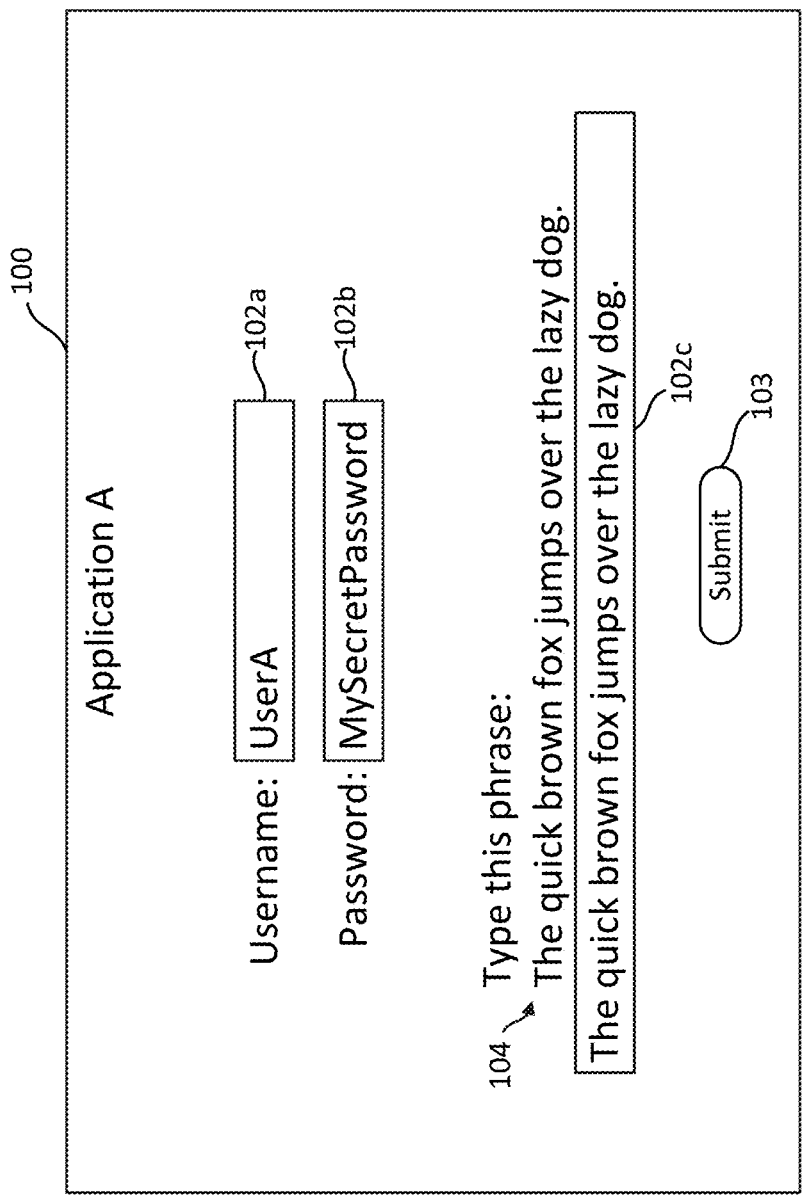
FIG. 1A shows an example display screen that may be presented by an application to authenticate the identity of a user in accordance with some aspects of the present disclosure.

For purposes of reading the description of the various embodiments below, the following descriptions of the sections of the specification and their respective contents may be helpful:

Section A provides an introduction to example embodiments of systems for identifying users based on typing behavior in accordance with some aspects of the present disclosure;

Section B describes a network environment which may be useful for practicing embodiments described herein;

Section C describes a computing system which may be useful for practicing embodiments described herein;

Section D describes embodiments of systems and methods for accessing computing resources using a cloud computing environment;

Section E provides a more detailed description of example embodiments of the systems introduced in Section A; and Section F describes example implementations of methods, systems/devices, and computer-readable media in accordance with the present disclosure.

A. Introduction to Illustrative Embodiments of Systems for Identifying Users Based on Typing Behavior Offered is a system for identifying a user based on the user's typing behavior. As used herein, "typing" refers to any mechanism for inputting characters into a computing device using fingers, including, without limitation, pressing keys on a mechanical keyboard, selecting characters of a "soft" keyboard displayed on touchscreen, etc. The inventor has recognized and appreciated that different users tend to exhibit different behaviors when typing the same sequence of characters, but that the typing behavior of the same user when inputting the same sequence of characters tends to be relatively consistent. For example, a given user may tend, on average, to press and hold a particular key, e.g., to select the uppercase letter "A," for a certain period of time prior to pressing another particular key, e.g., to select the lowercase letter "p." Such a time period is referred to herein as a "down interval" for a character. That same user may also tend, on average, to take a certain amount of time after releasing the key for the letter "A" to press the key for the letter "p." This time period is referred to herein as an "up interval" between keystrokes. Again, the terms "press," "release," etc., as used herein, are not intended to be limited to the manipulation of a mechanical keyboard, and are instead intended to also encompass actions relating to a soft keyboard, e.g., a keyboard displayed on a touchscreen.

By monitoring down intervals and/or up intervals, or perhaps other temporal characteristics, for various character-to-character transitions as a user types, data can be accumulated that is indicative of such temporal characteristics. Such data is referred to herein as "keystroke timing data." As explained in more detail below, the accumulated keystroke timing data for a given user may be used to generate "keystroke behavior data" that represents that user's typical typing behavior for various character-to-character transitions. In some implementations, for example, such keystroke behavior data may correspond to an average over time of the accumulated keystroke timing data for particular character-to-character transitions, possibly giving more weight to more recently accumulated samples. Once determined, the keystroke behavior data for the user may then be used to determine and/or verify the user's identity on a subsequent occasion. For instance, at a later time, a person may be prompted to type a sequence of characters, and keystroke timing data may be determined for that newly-typed sequence. The keystroke timing data for the newly-typed sequence may then be compared with the previously determined keyboard behavior data for the user to determine whether those two data sets have greater than a threshold level of similarity. If the two data sets are sufficiently similar, the person may be identified as the user. Additional scenarios in which such keyboard behavior data may be employed to determine and/or verify the identity of a person are described below.

FIG. 1A shows an example display screen 100 that may be presented by an application to authenticate the identity of a user in accordance with some aspects of the present disclosure. As shown, in the illustrated example, the authentication screen 100 includes a text box 102a for entry of a username, a text box 102b for entry of a secret password, and a text box 102c for entry of a phrase or other sequence of characters, e.g., in response to a prompt 104 identifying the phrase to be entered. As explained in more detail below, the techniques for identifying a user based on typing behavior may be performed based on the entry of characters into any one of, all of, or some subset of the text boxes 102a, 102b, and 102c. As shown, the display screen 100 may further include a submit button 103 that the user may select when through populating the text boxes 102. Upon successful authentication using one or more of the techniques described herein, the user may be granted access to additional functionality of the application and/or be provided with access to one or more other resources associated with the authentication screen 100. Although the example screen 100 relates to user authentication, it should be appreciated that the techniques disclosed herein may likewise be employed in any of a number of other circumstances in which it would be useful to determine a user's identity based on typing behavior. For instance, an application may monitor a user's typing behavior during normal use of the application to determine the user's identity, and may personalize one or more features of the application, e.g., based on profile data of the user, for the identified user.

Figure 1B:
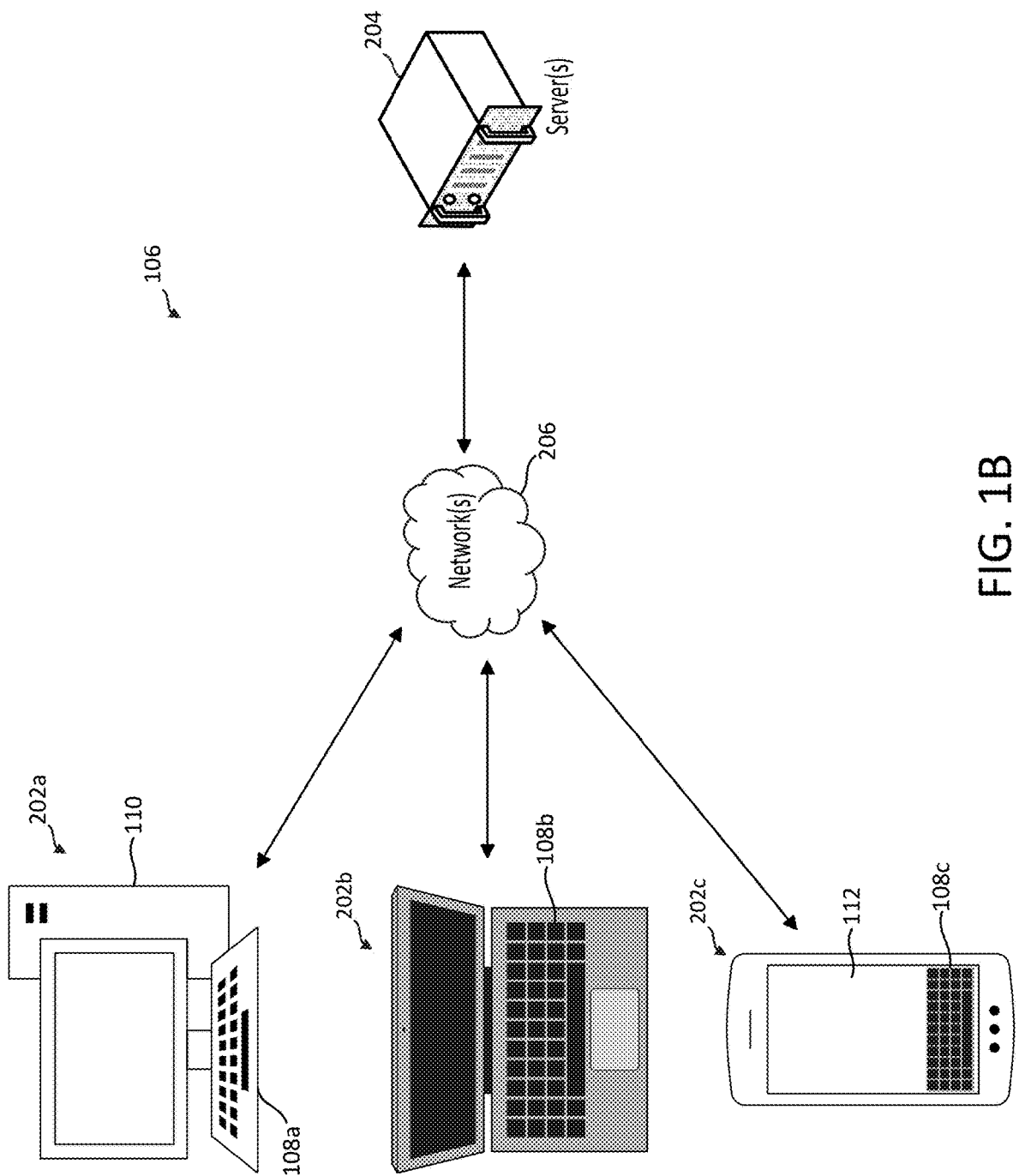
FIG. 1B shows an example system in which an application may be executed to generate the display screen shown in FIG. 1A.

FIG. 1B shows an example system 106 in which an application may be executed to generate the authentication screen 100 shown in FIG. 1A. In some implementations, the application may be executed on a remote computing system, e.g., on one or more servers 204, and the authentication screen 100 may be presented on a screen of a client device 202. In other implementations, the application may be executed locally on the client device 202. As shown in FIG. 1B, respective client devices 202a, 202b, 202c may include different types of keyboards 108. In particular, in the illustrated examples, the client device 202a includes a mechanical peripheral keyboard 108a, which may be connected to a personal computer 110 via universal serial bus (USB) cable, a wireless (e.g., Bluetooth) connection, or the like, the client device 202b includes a mechanical keyboard 108b built into a laptop computer, and the client device 202c includes a soft keyboard 108c displayed on a touchscreen 112 of a smartphone, tablet, or the like.

In some implementations, the application responsible for presenting the authentication screen 100 may include, or operate in conjunction with, a component configured to determine keystroke timing data (e.g., as the user enters characters in one or more of the text boxes 102) by monitoring a user's typing behavior with respect to the keyboard 108 that is used to enter such characters. That component is referred to herein as a "keystroke monitoring engine." The keystroke monitoring engine may take on any of numerous forms, depending on the implementation. For instance, in implementations in which the application is executed by a web server and delivered to a client device 202 as a web page, the keystroke monitoring engine may be implemented using JavaScript. In some implementations, for example, the keystroke monitoring engine may register one or more event handlers to listen for keyboard events, such as "keypress" events and "keyup" events, or touch events, such as "touchstart" and "touchend" events, of that client device 102.

As also explained in more detail below, recognizing that users interact differently with different types of keyboards 108, or perhaps even different models of the same keyboard type, in some implementations, accumulated keystroke timing data and/or determined keystroke behavior data may be segregated by keyboard device type, or perhaps by specific client devices 202 and/or specific keyboards 108 used by particular client devices 202 (e.g., when a user sometimes operates a laptop computer with a docking station and associated peripheral keyboard), and newly-acquired keystroke timing data may be compared against determined keystroke behavior data for the same keyboard type, client device 202, and/or specific keyboard 108. Further, in some implementations other contextual information concerning the circumstances in which keystroke timing data is measured, such as the content the user is typing (e.g., the particular words, sentences, paragraphs, etc., in which typed characters appear) and/or the physical circumstances in which a user is typing, e.g., time of day, location, etc., may additionally or alternatively be ascertained to segregate and compare keystroke timing data and keystroke behavior data to determine and/or verify the identity of a user. As explained further below, in some implementations, a "context determination engine" may be used to ascertain context data indicative one or more of such contextual factors, and that context data may be used to segregate and compare keystroke timing data and keystroke behavior data for such purposes.

FIG. 1C illustrates various parameters that may be determined for inclusion in keystroke timing data that is obtained when a user types a sequence of characters on a keyboard 108. FIG. 1D shows two example tables 114a, 114b that may be populated with keystroke timing data for two of the character-to-character transitions indicated in the keystroke timing data of FIG. 1C. It should be appreciated that similar tables 114 may be stored for some or all of the other possible transitions between typed characters. In some implementations, respective characters may be identified using standard American Standard Code for information Exchange (ASCII) codes.

The example parameters illustrated in FIG. 1C correspond to a circumstance in which the user typed the phrase "Cool Beans." As noted above, a keystroke monitoring engine associated with a client device 202 may listen for keyboard events, touch events, or the like, as the user operates a keyboard 108. Notifications for such events may be accompanied by timestamps indicating the times as which the events occurred. A shown in FIG. 1C, the keystroke monitoring engine may determine one or more of (A) "down intervals" (indicated as "$D_{int}$") for the respective characters that are typed, (B) "up intervals" (indicated as "$D_{up}$") between pairs of typed characters, (C) "down-to-down intervals" (indicated as "$D\text{-}D_{int}$") between the beginning times of adjacent "down intervals," and (D) "up-to-up intervals" (indicated as "$U\text{-}U_{int}$") between the beginning times of adjacent "up intervals." In FIG. 1C, the timestamps of events detected by the keystroke monitoring engine are indicated as "$t_1$," "$t_2$," and so on. For instance, "$t_1$" may correspond to a timestamp of a "keypress" event detected when the capital letter "C" (ASCII code "67") was pressed, and "$t_2$" may correspond to a timestamp of a "keyup" event detected when the capital letter "C" was subsequently released. Similarly, "$t_5$" may correspond to a timestamp of a "keypress" event detected when the space bar (ASCII code "32") was pressed, and "$t_6$" may correspond to a timestamp of a "keyup" event detected when the space bar was subsequently released.

As shown in FIG. 1D, in some implementations, the system 100 may record accumulate historical keystroke timing data corresponding to respective instances of particular character-to-character transitions. In the examples shown, respective instances of keystroke timing data for the indicated character-to-character transitions are indicated using different "index" entries in the tables 114. In some implementations, the indexes may be timestamps, or some other values, rather than sequential integers. The index "n" in the table 114a may correspond to a row of entries written in that table based on the data for the transition from the character "C" to the character "o" shown in FIG. 1C. Similarly, the index "m" in the table 114b may correspond to a row of entries written in that table based on the data for the transition from the "Space" character to the "B" character shown in FIG. 1C. The other rows in the tables 114a, 114b may correspond to keystroke timing data that was accumulated for prior detected instances of those same character-to-character transitions. FIG. 1D further illustrates how the respective entries in the rows "n" and "m" of the tables 114a and 114b may be calculated using the event timestamps (i.e., "$t_1$," "$t_2$," etc.) of FIG. 1C. As shown, in some implementations, the tables 114 may be correlated by user (e.g., per "user" entries 116) and by context, such as keyboard type, particular words in which the indicated character-to-character transitions were detected, time of day, etc. (e.g., per "context" entries 118). In the example shown, the tables 114 represent accumulated keystroke timing data for a user "U1" in a context "C1."

In some implementations, the keystroke timing data recorded in the tables 114 for respective character-to-character transitions may be averaged or otherwise processed to determine keystroke behavior data that represents how a user tends to interact with a keyboard as the user types particular sequences of characters. In some implementations, for example, for a given character-to-character transition, average values may be calculated for the respective columns of the table 114 for that transition. In some implementations, such average values may represent an average of all previously recorded rows, or all rows recorded over some particular time period (e.g., one month in the past). Alternatively, such average values may represent a moving average of the most recent "X" rows recorded. Further, in some implementations, more recent rows may be given more weight that older rows when calculating averages, such as by calculating weighted moving averages or exponential moving averages of the accumulated data.

In some implementations, keystroke timing data may be similarly acquired for a newly typed sequence of characters. For instance, a keystroke monitoring engine may be employed to acquire keystroke timing data for characters the user types into one or more of the text boxes 102*a-c* of FIG. 1A. That keystroke timing data may represent, for the respective character-to-character transitions in the newly-typed sequence of characters, one or more of the same temporal characteristics that are reflected in the columns of the tables 114.

By comparing the newly-acquired keystroke timing data for respective character-to-character transitions to the determined keystroke behavior data for those same character-to-character transitions, the system 106 may determine that the user who typed the newly-entered characters is likely the same individual who typed the characters on which the keystroke behavior data was based. Any of a number of techniques may be employed to evaluate the degree of similarity between the newly-acquired keystroke timing data and the determined keystroke behavior data. For example, in some implementations, for the respective character-to-character transitions that appear in the newly-typed sequence of characters, differences between values of newly measured temporal characteristics and the values for those same characteristics in the keystroke behavior data may be determined, and a sum of those differences for all of the character-to-character transitions in the newly-typed sequence may be calculated. In some implementations, the system 106 may determine that the person who typed the new characters is the same person who is associated with the keystroke behavior data, e.g., if that sum of differences is below a threshold number. Other, and perhaps more sophisticated techniques, may additionally or alternatively be used in other implementations, such as by applying different weights to different temporal characteristics, applying different weights to certain regions of the newly-typed character sequence (e.g., the characters that are near the middle of the newly-typed character sequence), etc.

It should be noted that the historical keystroke timing data (e.g., as reflected in the tables 114*a* and 114*b*) may be accumulated in any of a number of ways, and may be based on the typing of characters in any of a number of contexts. For instance, in some implementations, the historical keystroke timing data may be accumulated based on typing behavior other than a user inputting characters into an "authentication" user interface, e.g., such as the authentication screen 100 shown in FIG. 1A. In some implementations, for example, a keystroke monitoring engine may run in the background of a client device 202 to monitor a user's typing behavior as the user interacts with one or more other applications. In other implementations, historical keystroke timing data may instead be based solely on a user's typing behavior as the user types characters into one of more of the text boxes 102*a-c*. For instance, in some implementations, the historical keystroke timing data stored in the tables 114 may be based solely on instances in which the user has previously typed characters into the text box 102*c* in response to one or more prompts 104. In some such implementations, the system 106 may modify the prompt 104 over time to ensure a robust collection of meaningful keystroke timing data is acquired from the user for use in evaluating the user's typing behavior when inputting characters into the text box 102*c* on subsequent occasions and in response to different prompts 104.

Further, if the system 106 maintains keystroke behavior data for multiple users, in addition to determining or verifying the identity of a particular user, the system 106 may determine whether one user is pretending to be another user. For instance, if a person is attempting to log onto the system 106 as a first user, but the system 106 determines that the keystroke timing data for a newly-entered sequence of characters (e.g., entered via the text box 102*c* or otherwise) is highly similar the keystroke behavior data of a second user, the system 106 may determine not to authenticate the first user's identity, even if the keystroke timing data would have otherwise been sufficiently similar to stored keyboard behavior data of the first user to warrant authentication.

Additional details and example implementations of embodiments of the present disclosure are set forth below in Section E, following a description of example systems and network environments in which such embodiments may be deployed.

B. Network Environment

Figure 2:
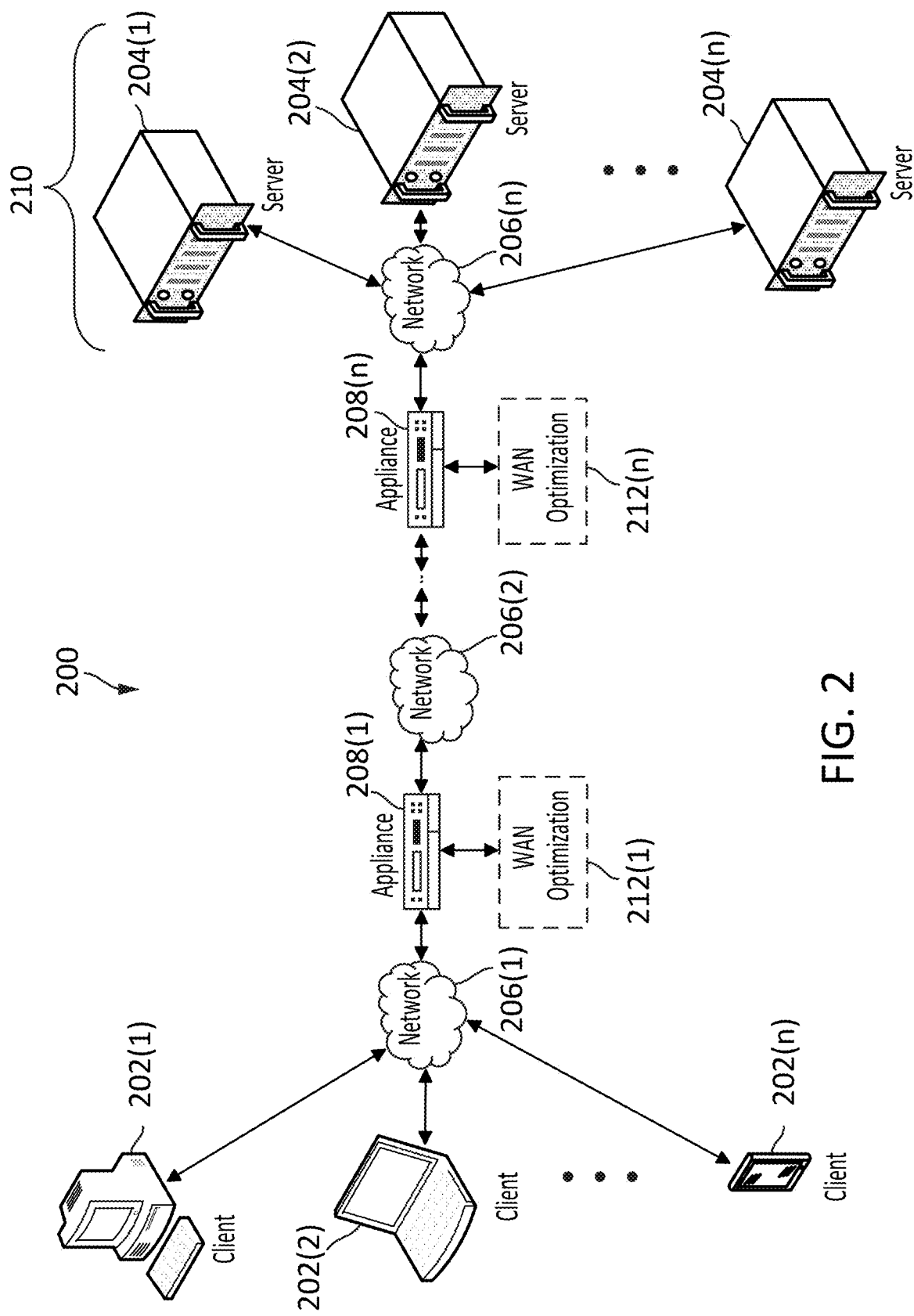
FIG. 2 is a diagram of a network environment in which some embodiments of the systems for identifying users based on typing behavior disclosed herein may deployed.

Referring to FIG. 2, an illustrative network environment 200 is depicted. As shown, the network environment 200 may include one or more clients 202(1)-**202(*n*) (also generally referred to as local machine(s) 202 or client(s) 202) in communication with one or more servers 204(1)-204(*n*) (also generally referred to as remote machine(s) 204 or server(s) 204) via one or more networks 206(1)-206(*n*) (generally referred to as network(s) 206). In some embodiments, a client 202 may communicate with a server 204 via one or more appliances 208(1)-208(*n*) (generally referred to as appliance(s) 208 or gateway(s) 208). In some embodiments, a client 202 may have the capacity to function as both a client node seeking access to resources provided by a server 204 and as a server 204 providing access to hosted resources for other clients 202**.

Although the embodiment shown in FIG. 2 shows one or more networks 206 between the clients 202 and the servers 204, in other embodiments, the clients 202 and the servers 204 may be on the same network 206. When multiple networks 206 are employed, the various networks 206 may be the same type of network or different types of networks. For example, in some embodiments, the networks 206(1) and **206(*n*) may be private networks such as local area network (LANs) or company Intranets, while the network 206(2) may be a public network, such as a metropolitan area network (MAN), wide area network (WAN), or the Internet. In other embodiments, one or both of the network 206(1) and the network 206(*n*), as well as the network 206(2), may be public networks. In yet other embodiments, all three of the network 206(1), the network 206(2) and the network 206(*n*) may be private networks. The networks 206 may employ one or more types of physical networks and/or network topologies, such as wired and/or wireless networks, and may employ one or more communication transport protocols, such as transmission control protocol (TCP), internet protocol (IP), user datagram protocol (UDP) or other similar protocols. In some embodiments, the network(s) 206 may include one or more mobile telephone networks that use various protocols to communicate among mobile devices. In some embodiments, the network(s) 206 may include one or more wireless local-area networks (WLANs). For short range communications within a WLAN, clients 202** may communicate using 802.11, Bluetooth, and/or Near Field Communication (NFC).

As shown in FIG. 2, one or more appliances 208 may be located at various points or in various communication paths of the network environment 200. For example, the appliance 208(1) may be deployed between the network 206(1) and the network 206(2), and the appliance 208(n) may be deployed between the network 206(2) and the network 206(n). In some embodiments, the appliances 208 may communicate with one another and work in conjunction to, for example, accelerate network traffic between the clients 202 and the servers 204. In some embodiments, appliances 208 may act as a gateway between two or more networks. In other embodiments, one or more of the appliances 208 may instead be implemented in conjunction with or as part of a single one of the clients 202 or servers 204 to allow such device to connect directly to one of the networks 206. In some embodiments, one of more appliances 208 may operate as an application delivery controller (ADC) to provide one or more of the clients 202 with access to business applications and other data deployed in a datacenter, the cloud, or delivered as Software as a Service (SaaS) across a range of client devices, and/or provide other functionality such as load balancing, etc. In some embodiments, one or more of the appliances 208 may be implemented as network devices sold by Citrix Systems, Inc., of Fort Lauderdale, FL, such as Citrix Gateway™ or Citrix ADC™.

A server 204 may be any server type such as, for example: a file server; an application server; a web server; a proxy server; an appliance; a network appliance; a gateway; an application gateway; a gateway server; a virtualization server; a deployment server; a Secure Sockets Layer Virtual Private Network (SSL VPN) server; a firewall; a web server; a server executing an active directory; a cloud server; or a server executing an application acceleration program that provides firewall functionality, application functionality, or load balancing functionality.

A server 204 may execute, operate or otherwise provide an application that may be any one of the following: software; a program; executable instructions; a virtual machine; a hypervisor; a web browser; a web-based client; a client-server application; a thin-client computing client; an ActiveX control; a Java applet; software related to voice over internet protocol (VoIP) communications like a soft IP telephone; an application for streaming video and/or audio; an application for facilitating real-time-data communications; a HTTP client; a FTP client; an Oscar client; a Telnet client; or any other set of executable instructions.

In some embodiments, a server 204 may execute a remote presentation services program or other program that uses a thin-client or a remote-display protocol to capture display output generated by an application executing on a server 204 and transmit the application display output to a client device 202.

In yet other embodiments, a server 204 may execute a virtual machine providing, to a user of a client 202, access to a computing environment. The client 202 may be a virtual machine. The virtual machine may be managed by, for example, a hypervisor, a virtual machine manager (VMM), or any other hardware virtualization technique within the server 204.

As shown in FIG. 2, in some embodiments, groups of the servers 204 may operate as one or more server farms 210. The servers 204 of such server farms 210 may be logically grouped, and may either be geographically co-located (e.g., on premises) or geographically dispersed (e.g., cloud based) from the clients 202 and/or other servers 204. In some embodiments, two or more server farms 210 may communicate with one another, e.g., via respective appliances 208 connected to the network 206(2), to allow multiple server-based processes to interact with one another.

As also shown in FIG. 2, in some embodiments, one or more of the appliances 208 may include, be replaced by, or be in communication with, one or more additional appliances, such as WAN optimization appliances 212(1)-212(n), referred to generally as WAN optimization appliance(s) 212. For example, WAN optimization appliances 212 may accelerate, cache, compress or otherwise optimize or improve performance, operation, flow control, or quality of service of network traffic, such as traffic to and/or from a WAN connection, such as optimizing Wide Area File Services (WAFS), accelerating Server Message Block (SMB) or Common Internet File System (CIFS). In some embodiments, one or more of the appliances 212 may be a performance enhancing proxy or a WAN optimization controller.

In some embodiments, one or more of the appliances 208, 212 may be implemented as products sold by Citrix Systems, Inc., of Fort Lauderdale, FL, such as Citrix SD-WAN™ or Citrix Cloud™. For example, in some implementations, one or more of the appliances 208, 212 may be cloud connectors that enable communications to be exchanged between resources within a cloud computing environment and resources outside such an environment, e.g., resources hosted within a data center of+ an organization.

C. Computing Environment

Figure 3:
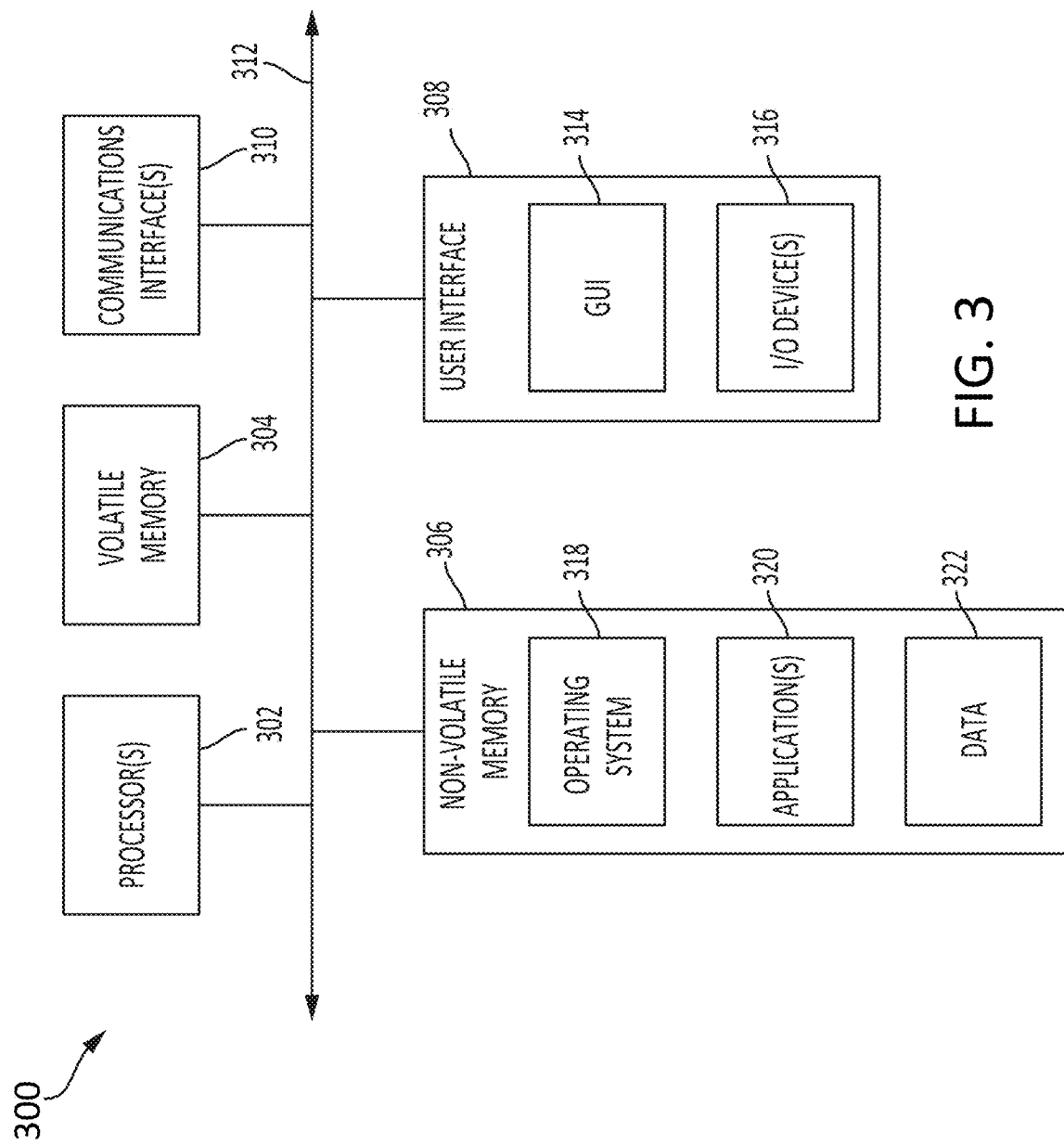
FIG. 3 is a block diagram of a computing system that may be used to implement one or more of the components of the computing environment shown in FIG. 2 in accordance with some embodiments.

FIG. 3 illustrates an example of a computing system 300 that may be used to implement one or more of the respective components (e.g., the clients 202, the servers 204, the appliances 208, 212) within the network environment 200 shown in FIG. 2. As shown in FIG. 3, the computing system 300 may include one or more processors 302, volatile memory 304 (e.g., RAM), non-volatile memory 306 (e.g., one or more hard disk drives (HDDs) or other magnetic or optical storage media, one or more solid state drives (SSDs) such as a flash drive or other solid state storage media, one or more hybrid magnetic and solid state drives, and/or one or more virtual storage volumes, such as a cloud storage, or a combination of such physical storage volumes and virtual storage volumes or arrays thereof), a user interface (UI) 308, one or more communications interfaces 310, and a communication bus 312. The user interface 308 may include a graphical user interface (GUI) 314 (e.g., a touchscreen, a display, etc.) and one or more input/output (I/O) devices 316 (e.g., a mouse, a keyboard, etc.). The non-volatile memory 306 may store an operating system 318, one or more applications 320, and data 322 such that, for example, computer instructions of the operating system 318 and/or applications 320 are executed by the processor(s) 302 out of the volatile memory 304. Data may be entered using an input device of the GUI 314 or received from I/O device(s) 316. Various elements of the computing system 300 may communicate via communication the bus 312. The computing system 300 as shown in FIG. 3 is shown merely as an example, as the clients 202, servers 204 and/or appliances 208 and 212 may be implemented by any computing or processing environment and with any type of machine or set of machines that may have suitable hardware and/or software capable of operating as described herein.

The processor(s) 302 may be implemented by one or more programmable processors executing one or more computer programs to perform the functions of the system. As used herein, the term "processor" describes an electronic circuit that performs a function, an operation, or a sequence of operations. The function, operation, or sequence of operations may be hard coded into the electronic circuit or soft coded by way of instructions held in a memory device. A "processor" may perform the function, operation, or sequence of operations using digital values or using analog signals. In some embodiments, the "processor" can be embodied in one or more application specific integrated circuits (ASICs), microprocessors, digital signal processors, microcontrollers, field programmable gate arrays (FPGAs), programmable logic arrays (PLAs), multi-core processors, or general-purpose computers with associated memory. The "processor" may be analog, digital or mixed-signal. In some embodiments, the "processor" may be one or more physical processors or one or more "virtual" (e.g., remotely located or "cloud") processors.

The communications interfaces 310 may include one or more interfaces to enable the computing system 300 to access a computer network such as a Local Area Network (LAN), a Wide Area Network (WAN), a Personal Area Network (PAN), or the Internet through a variety of wired and/or wireless connections, including cellular connections.

As noted above, in some embodiments, one or more computing systems 300 may execute an application on behalf of a user of a client computing device (e.g., a client 202 shown in FIG. 2), may execute a virtual machine, which provides an execution session within which applications execute on behalf of a user or a client computing device (e.g., a client 202 shown in FIG. 2), such as a hosted desktop session, may execute a terminal services session to provide a hosted desktop environment, or may provide access to a computing environment including one or more of: one or more applications, one or more desktop applications, and one or more desktop sessions in which one or more applications may execute.

Figure 4:
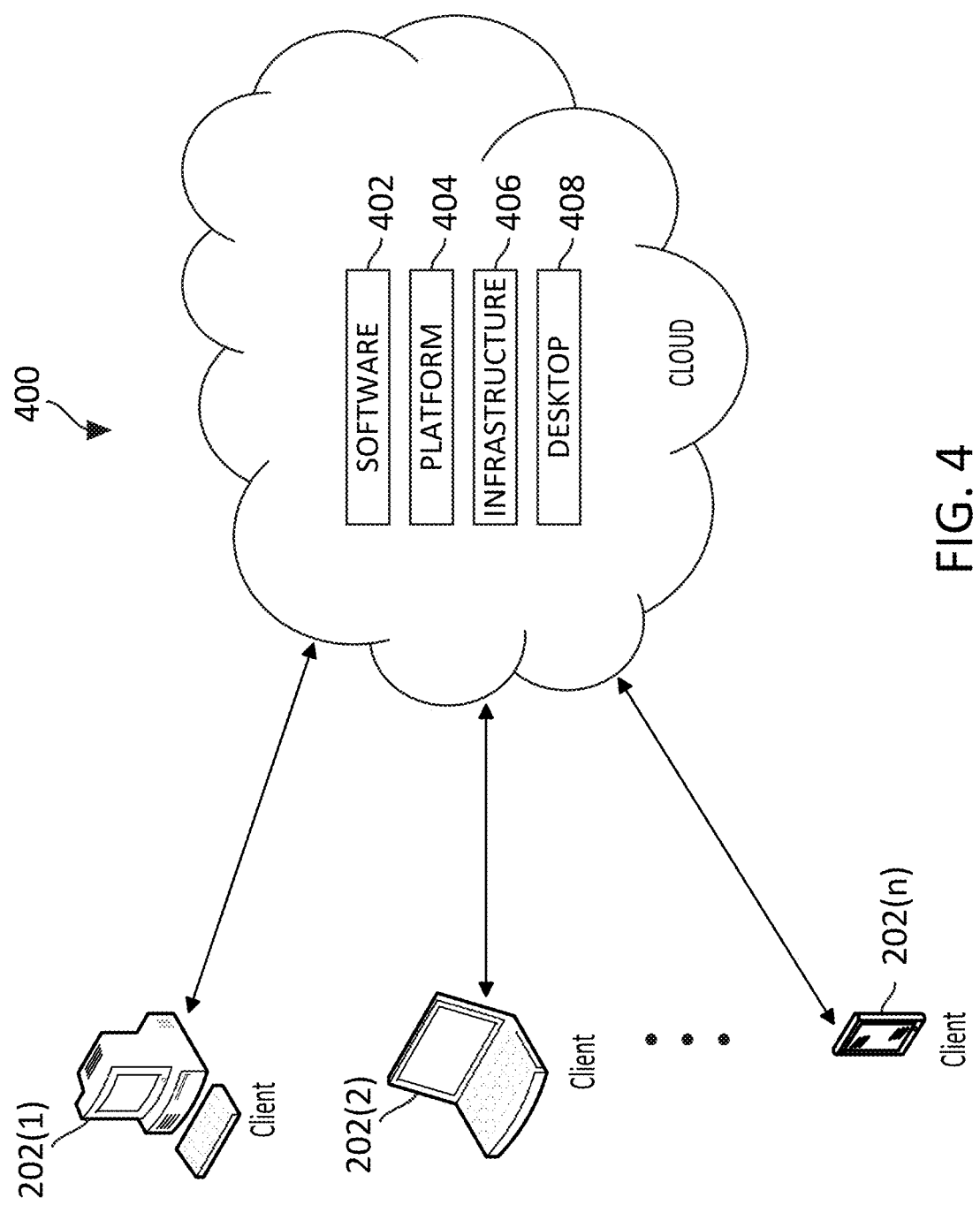
FIG. 4 is a schematic block diagram of a cloud computing environment in which various aspects of the disclosure may be implemented.

D. Systems and Methods for Delivering Shared Resources Using a Cloud Computing Environment Referring to FIG. 4, a cloud computing environment 400 is depicted, which may also be referred to as a cloud environment, cloud computing or cloud network. The cloud computing environment 400 can provide the delivery of shared computing services and/or resources to multiple users or tenants. For example, the shared resources and services can include, but are not limited to, networks, network bandwidth, servers, processing, memory, storage, applications, virtual machines, databases, software, hardware, analytics, and intelligence.

In the cloud computing environment 400, one or more clients 202 (such as those described in connection with FIG. 2) are in communication with a cloud network 404. The cloud network 404 may include back-end platforms, e.g., servers, storage, server farms and/or data centers. The clients 202 may correspond to a single organization/tenant or multiple organizations/tenants. More particularly, in one example implementation, the cloud computing environment 400 may provide a private cloud serving a single organization (e.g., enterprise cloud). In another example, the cloud computing environment 400 may provide a community or public cloud serving multiple organizations/tenants.

In some embodiments, a gateway appliance(s) or service may be utilized to provide access to cloud computing resources and virtual sessions. By way of example, Citrix Gateway, provided by Citrix Systems, Inc., may be deployed on-premises or on public clouds to provide users with secure access and single sign-on to virtual, SaaS and web applications. Furthermore, to protect users from web threats, a gateway such as Citrix Secure Web Gateway may be used. Citrix Secure Web Gateway uses a cloud-based service and a local cache to check for URL reputation and category.

In still further embodiments, the cloud computing environment 400 may provide a hybrid cloud that is a combination of a public cloud and one or more resources located outside such a cloud, such as resources hosted within one or more data centers of an organization. Public clouds may include public servers that are maintained by third parties to the clients 202 or the enterprise/tenant. The servers may be located off-site in remote geographical locations or otherwise. In some implementations, one or more cloud connectors may be used to facilitate the exchange of communications between one more resources within the cloud computing environment 400 and one or more resources outside of such an environment.

The cloud computing environment 400 can provide resource pooling to serve multiple users via clients 202 through a multi-tenant environment or multi-tenant model with different physical and virtual resources dynamically assigned and reassigned responsive to different demands within the respective environment. The multi-tenant environment can include a system or architecture that can provide a single instance of software, an application or a software application to serve multiple users. In some embodiments, the cloud computing environment 400 can provide on-demand self-service to unilaterally provision computing capabilities (e.g., server time, network storage) across a network for multiple clients 202. By way of example, provisioning services may be provided through a system such as Citrix Provisioning Services (Citrix PVS). Citrix PVS is a software-streaming technology that delivers patches, updates, and other configuration information to multiple virtual desktop endpoints through a shared desktop image. The cloud computing environment 400 can provide an elasticity to dynamically scale out or scale in response to different demands from one or more clients 202. In some embodiments, the cloud computing environment 400 may include or provide monitoring services to monitor, control and/or generate reports corresponding to the provided shared services and resources.

In some embodiments, the cloud computing environment 400 may provide cloud-based delivery of different types of cloud computing services, such as Software as a service (SaaS) 402, Platform as a Service (PaaS) 404, Infrastructure as a Service (IaaS) 406, and Desktop as a Service (DaaS) 408, for example. IaaS may refer to a user renting the use of infrastructure resources that are needed during a specified time period. IaaS providers may offer storage, networking, servers or virtualization resources from large pools, allowing the users to quickly scale up by accessing more resources as needed. Examples of IaaS platforms include AMAZON WEB SERVICES provided by Amazon.com, Inc., of Seattle, Washington, Azure IaaS provided by Microsoft Corporation or Redmond, Washington, RACKSPACE CLOUD provided by Rackspace US, Inc., of San Antonio, Texas, Google Compute Engine provided by Google Inc. of Mountain View, California, and RIGHTSCALE provided by RightScale, Inc., of Santa Barbara, California.

PaaS providers may offer functionality provided by IaaS, including, e.g., storage, networking, servers or virtualization, as well as additional resources such as, e.g., the operating system, middleware, or runtime resources. Examples of PaaS include WINDOWS AZURE provided by Microsoft Corporation of Redmond, Washington, Google App Engine provided by Google Inc., and HEROKU provided by Heroku, Inc. of San Francisco, California.

SaaS providers may offer the resources that PaaS provides, including storage, networking, servers, virtualization, operating system, middleware, or runtime resources. In some embodiments, SaaS providers may offer additional resources including, e.g., data and application resources. Examples of SaaS include GOOGLE APPS provided by Google Inc., SALESFORCE provided by Salesforce.com Inc. of San Francisco, California, or OFFICE 365 provided by Microsoft Corporation. Examples of SaaS may also include data storage providers, e.g. Citrix ShareFile® from Citrix Systems, DROPBOX provided by Dropbox, Inc. of San Francisco, California, Microsoft SKYDRIVE provided by Microsoft Corporation, Google Drive provided by Google Inc., or Apple ICLOUD provided by Apple Inc. of Cupertino, California.

Similar to SaaS, DaaS (which is also known as hosted desktop services) is a form of virtual desktop infrastructure (VDI) in which virtual desktop sessions are typically delivered as a cloud service along with the apps used on the virtual desktop. Citrix Cloud from Citrix Systems is one example of a DaaS delivery platform. DaaS delivery platforms may be hosted on a public cloud computing infrastructure, such as AZURE CLOUD from Microsoft Corporation of Redmond, Washington, or AMAZON WEB SERVICES provided by Amazon.com, Inc., of Seattle, Washington, for example. In the case of Citrix Cloud, Citrix Workspace app may be used as a single-entry point for bringing apps, files and desktops together (whether on-premises or in the cloud) to deliver a unified experience.

E. Detailed Description of Example Embodiments of Systems for Identifying Users Based on Typing Behavior As described in Section A above, one or more computing devices 202, 204 within the system 106 (shown in FIG. 1B) may be configured to identify a user operating a keyboard 108 of a client device 202 based on the user's typing behavior. For instance, as discussed in connection with FIG. 1A, an application may present a user interface including one or more text boxes 102 into which the user may type a sequence of characters, and the system 106 may determine and/or validate the user's identity based on acquired keystroke timing data that is indicative of the timing of the user's interactions with the keyboard 108 of the client device 202.

Figure 5:
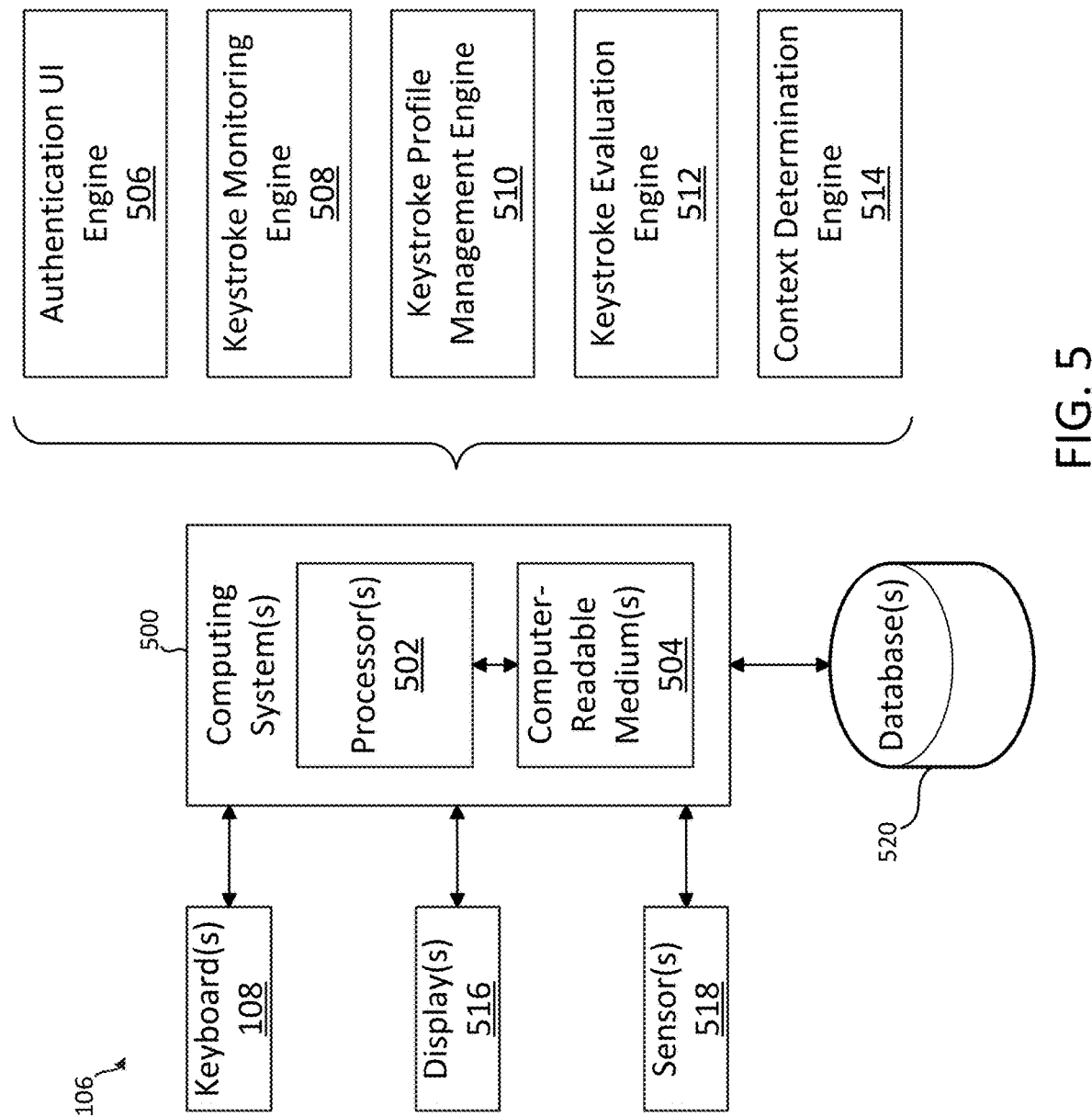
FIG. 5 shows example components that may be included in a system for determining and/or validating a user's identity based on acquired keystroke timing data that is indicative the timing of the user's interactions with a keyboard of client device.

As shown in FIG. 5, the system 106 introduced in Section A may include one or more computing systems 500 that each include one or more processors 502 and one or more computer-readable mediums 504. The computer-readable medium(s) 504 may be encoded with instructions which, when executed by the processor(s) 502, cause the computing system(s) 500 to implement the functionality described herein, including operations of one or more of the engines 506, 508, 510, 512 and 514 shown in FIG. 5, and as described in detail below.

One or more of the engines 506, 508, 510, 512 and 514 may be included a client device(s) 202, such as the client devices 202a-c shown in FIG. 1B. One of more of the keyboard(s) 108 and display(s) 516 shown in FIG. 5 may be included within, or associated with, such client device(s) 202. As shown, in some implementations, one or more of the client devices 202 may additionally include, or be associated with, one or more sensors 518, such as a camera, microphone, etc. As explained below, in some implementations, such sensor(s) 518 may be used to monitor one or more additional or different aspects of how a person interacts with a keyboard 108, such as how high a user's fingers are raised when striking keys, which fingers are used to strike which keys, how loudly the user strikes respective keys, whether and which sounds are enabled for a soft keyboard, etc., and that additional or different data may be recorded along with, or in lieu of, the keystroke timing data discussed herein, and may then be used to determine and/or verify the identity of a user operating a keyboard 108 on a subsequent occasion.

Figure 6:
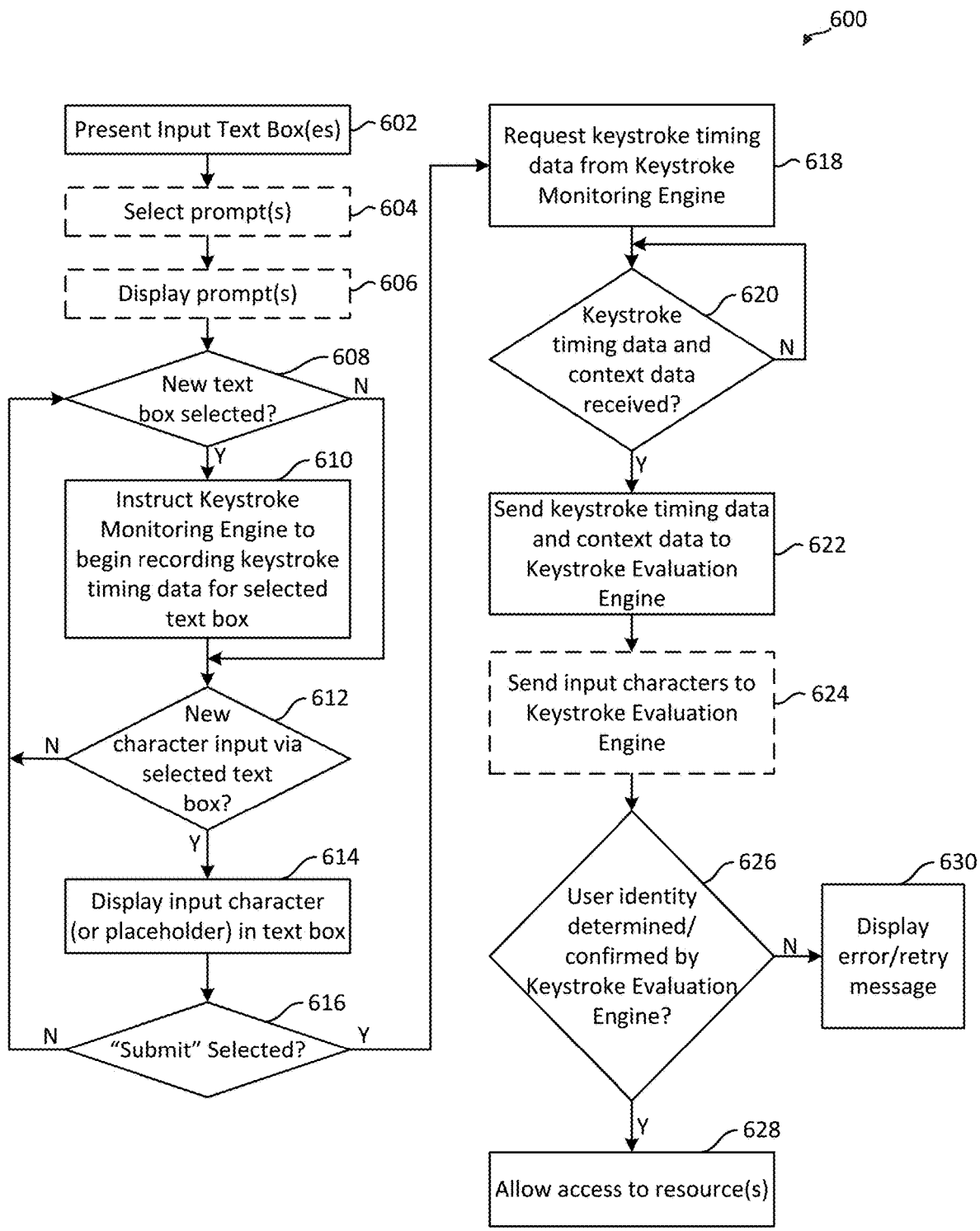
FIG. 6 shows an example routine that may be performed by the authentication user interface (UI) engine shown in FIG. 5.

The authentication user interface (UI) engine 506 may be responsible for generating an authentication user interface, such as the authentication screen 100 shown in FIG. 1A, as well as processing user inputs to that user interface. An example routine 600 that may be performed by the authentication UI engine 506 for such purposes is described below in connection with FIG. 6.

Figure 7:
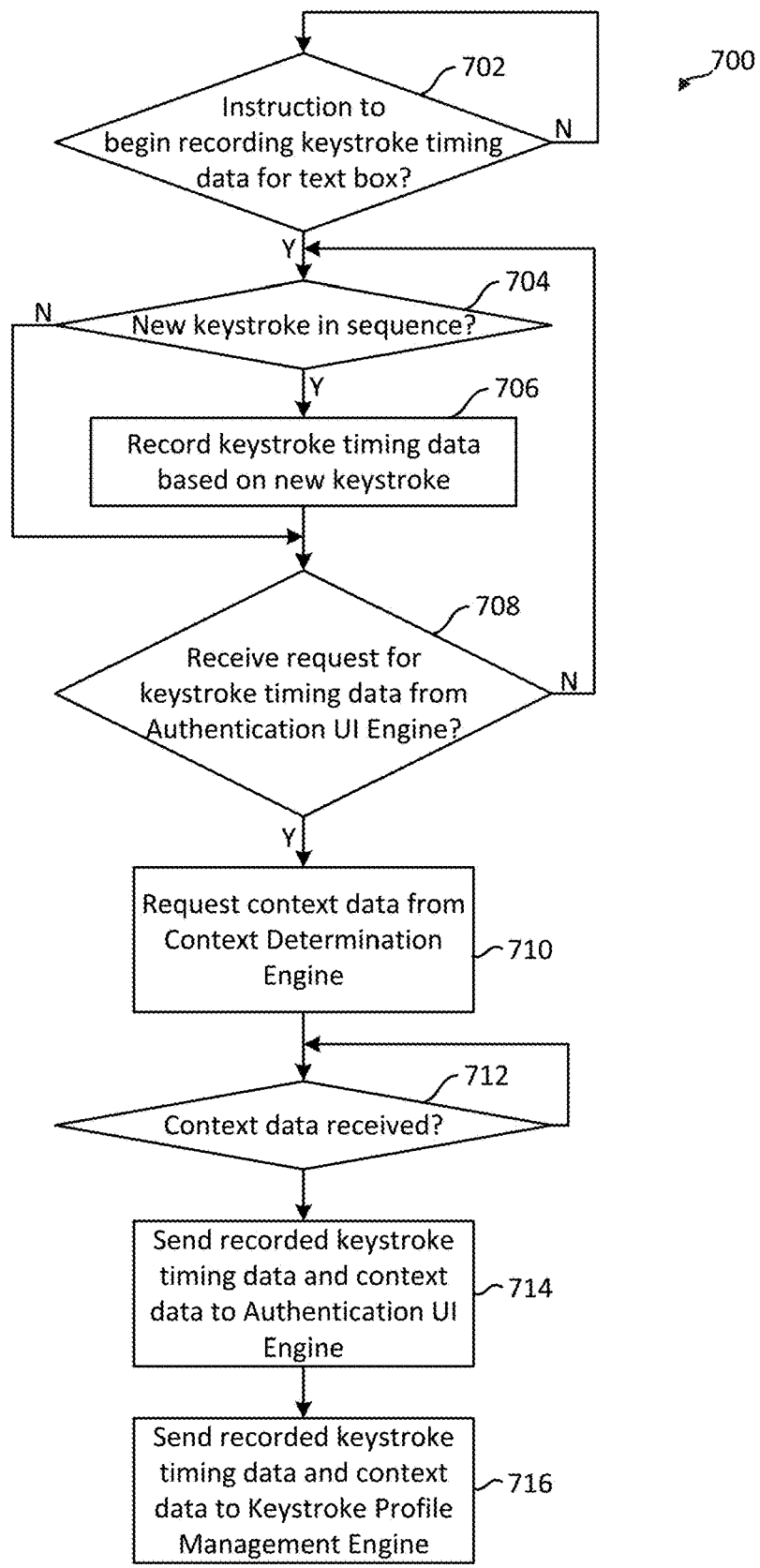
FIG. 7 shows an example routine that may be performed by the keystroke monitoring engine shown in FIG. 5.

The keystroke monitoring engine 508 may be responsible for tracking a user's interactions with a keyboard 108 (e.g., as the user types characters into one or more of the text boxes 102) to determine keystroke timing data corresponding to such interactions. In some implementations, the keystroke monitoring engine 508 may also determine context data indicative of the contextual circumstances in which such keystroke timing data was measured, so that such context data may be used to segregate and compare keystroke timing data and keystroke behavior data for different contextual scenarios. As explained below, in some implementations, the keystroke monitoring engine 508 may rely on the context determination engine 514 to acquire pertinent context data for such purposes. An example routine 700 that may be performed by the keystroke monitoring engine 508 is described below in connection with FIG. 7. The table 800 shown in FIG. 8 illustrates examples of keystroke timing data values that may calculated by the keystroke monitoring engine 508 based on the keyboard events illustrated in FIG. 1C. In some implementations, the keystroke monitoring engine 508 may be located, at least in part, in a client device 202 that includes, or is associated with, the keyboard 108 whose input is being monitored.

The keystroke profile management engine 510 may be responsible for accumulating keystroke timing data measured by the keystroke monitoring engine 508, segregating that accumulated data by user and context, and for calculating keystroke behavior data for respective users and contexts based on the accumulated and segregated keystroke timing data. An example routine 900 that may be performed by the keystroke profile management engine 510 is described below in connection with FIG. 9. The tables 114 shown in FIG. 1D illustrate examples of keystroke timing data values that may be stored by the keystroke profile management engine 510 (e.g., in the database 520 shown in FIG. 5) based on the keyboard events illustrated in FIG. 1C. The table 1000 shown in FIG. 10 illustrates examples of keystroke behavior data values that may be calculated and stored (e.g., in the database 520) by the keystroke profile management engine 510 for respective users and contexts based on the keystroke timing data in the tables 114 (shown in FIG. 1D). In some implementations, the keystroke profile management engine 510 may be located remotely from the client device 202 that includes, or is associated with, the keyboard 108 whose input is being monitored. For example, in some implementations, the keystroke profile management engine 510 may be implemented by one or more servers 204 that are in communication with the client device 202 over one or more networks 206, such as illustrated in FIG. 1B. In other implementations, the keystroke profile management engine 510 may instead be implemented, at least in part, on the client device 202 that includes, or is associated with, the keyboard 108 whose input is being monitored.

The keystroke evaluation engine 512 may be responsible for comparing keystroke timing data for newly-typed characters (e.g., characters entered into one or more of the text boxes 102 shown in FIG. 1A) and keystroke behavior data for the character-to-character transitions represented within such newly-acquired keystroke timing data, to determine whether those two data sets are sufficiently similar to warrant a conclusion that the person who typed the newly typed characters is likely the same person who typed the characters upon with the keystroke behavior data is based. In some implementations, the keystroke evaluation engine 512 may also be responsible for determining whether the particular characters that were input into one or more of the text boxes 102 (e.g., a user name and/or password) also match stored authentication credentials for the same user, i.e., the user who is associated with the keystroke behavior data that was determined to be sufficiently similar to the newly-acquired keystroke timing data. An example routine 1100 that may be performed by the keystroke evaluation engine 512 is described below in connection with FIG. 11.

In some implementations, the keystroke evaluation engine 512 may be located remotely from the client device 202 that includes, or is associated with, the keyboard 108 whose input is being monitored. For example, in some implementations, the keystroke evaluation engine 512 may be implemented by one or more servers 204 that are in communication with the client device 202 over a network 206, such as illustrated in FIG. 1B. In other implementations, the keystroke evaluation engine 512 may instead be implemented, at least in part, on the client device 202 that includes, or is associated with, the keyboard 108 whose input is being monitored. The keystroke evaluation engine 512 may be co-located with the keystroke profile management engine 510 (e.g., as part of the same application and/or on the same server 204), or may instead be remote from the keystroke profile management engine 510 and communicate with the keystroke profile management engine 510 over the network(s) 206.

Figure 12:
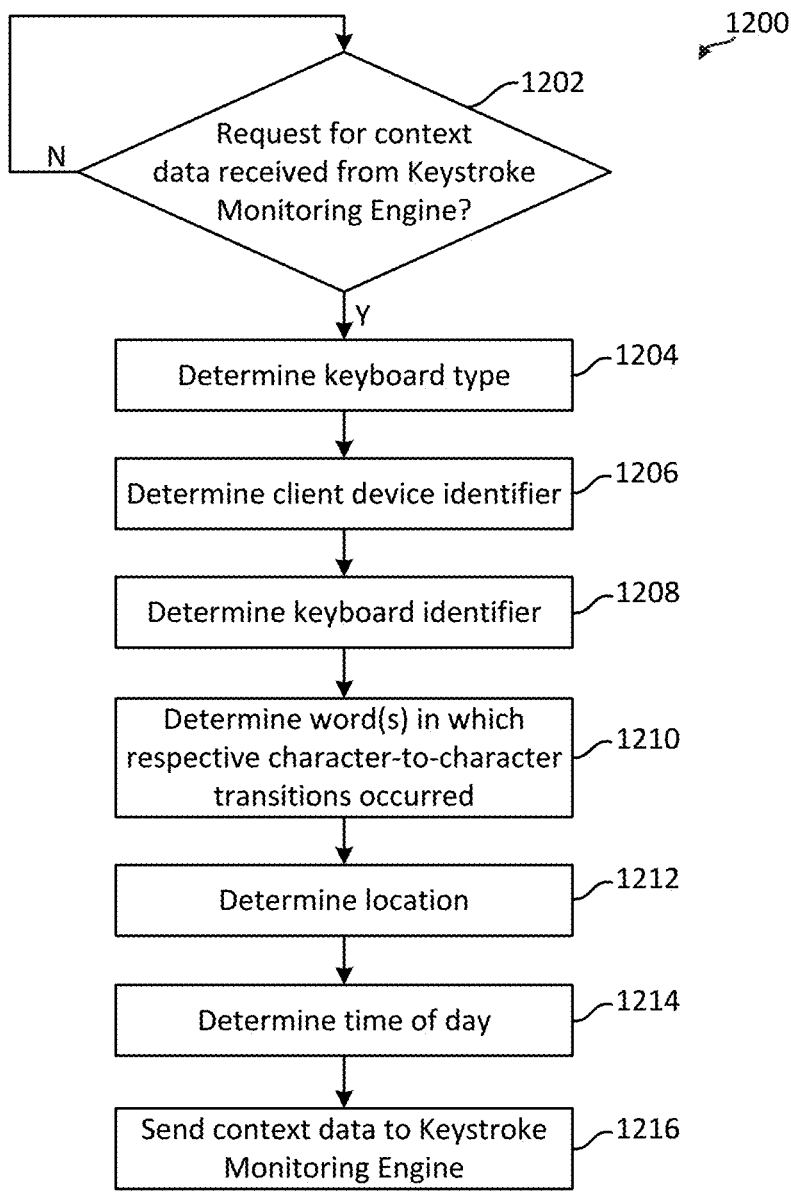
FIG. 12 shows an example routine that may be performed by the context determination engine shown in FIG. 5.

As indicated above, the context determination engine 514 may be responsible for determining one or more contextual circumstances, e.g., keyboard type, particular client device 202, particular keyboard used by a client device, particular words in which monitored character-to character transitions appear, time of day, location, etc., in which keystroke timing data is measured by the keystroke monitoring engine 508. An example routine 1200 that may be performed by the context determination engine 514 for such purposes is described below in connection with FIG. 12. In some implementations, the context determination engine 514 may be located, at least in part, in a client device 202 that includes, or is associated with, the keyboard 108 whose input is being monitored.

As noted above, FIG. 6 shows an example routine 600 that may be performed by the authentication UI engine 506 shown in FIG. 5. As shown, the routine 600 may begin at a step 602, at which the authentication UI engine 506 may cause a display screen of a computing system to present one or more of the text boxes 102 (shown in FIG. 1A) for authenticating the identity of a user. It should be appreciated that text boxes of one or more of the types indicated in FIG. 1A need not be employed in some embodiments. For example, in some implementations, only one text box (e.g., only the text box 102c), or some subset of the illustrated text boxes (e.g., only the text boxes 102a and 102b), may instead be employed.

At a step 604 of the routine 600, the authentication UI engine 506 may select one or more prompts 104 to present on the display screen 100 together with one or more of the text boxes 102. At a step 606, the authentication UI engine 506 may present the selected prompt(s) 104 adjacent the text box(es) 102 for which prompts 104 are to be provided. It should be appreciated that prompts 104 need not be employed, and indeed may be undesirable, for certain types of text boxes 102, such as the username text box 102a and/or password text box 102b shown in FIG. 1A, in which secret or private information is to be input. As noted above, in some implementations, prompts 104 for one or more text boxes 102, e.g., the text box 102c shown in FIG. 1A, may be altered from time to time, so as to ensure the accumulation of keystroke timing data for a wide variety of character-to-character transitions, and also to make it more difficult for an impostor to mimic the typing behavior of an authorized user.

At a decision step 608, the authentication UI engine 506 may determine whether one of the displayed text boxes 102 has been newly selected for character entry. In response to such a selection, the authentication UI engine 506 may, for instance, display a cursor within the text box 102 to indicate that characters can be inserted in response to typing on a keyboard 108. In some implementations, such as when a client device 202 includes a touchscreen 112 (such as with the client device 202c shown in FIG. 1B), a soft keyboard 108c may also be displayed in response to selection of a text box 102.

When, at the decision step 608, the authentication UI engine 506 determines that a new text box 102 has been selected for character entry, the routine 600 may proceed to a step 610, at which the authentication UI engine 506 may instruct the keystroke monitoring engine 508 to begin recording keystroke timing data for characters that are subsequently entered into the selected text box 102 as the user types on the keyboard 108. As noted above, an example routine 700 that may be performed by the keystroke monitoring engine 508 for that purpose is described below in connection with FIG. 7.

At a decision step 612, the authentication UI engine 506 may determine whether a new character has been input via a text box 102 that has been selected for character entry. In some implementations, for example, the authentication UI engine 506 may determine that a new character has been entered in response to receiving a notification of a keypress event for a mechanical keyboard or a touchstart event for a soft keyboard.

When, at the decision step 608, the authentication UI engine 506 determines that a new text box 102 has not been selected for character entry, the routine 600 may instead proceed directly to the decision step 612.

When, at the decision step 612, the authentication UI engine 506 determines that a new character has been input into a selected text box 102, the routine 600 may proceed to a step 614, at which the authentication UI engine 506 may cause the newly-input character (or a placeholder, e.g., an asterisk, for the character, such as when secret information, e.g., a password, is being entered) to be displayed within the selected text box 102. When, on the other hand, the authentication UI engine 506 determines (at the decision step 612) that a new character has not been input to a selected text box 102, the routine 600 may instead return to the decision step 608, at which the authentication UI engine 506 may again determine whether a new text box 102 has been selected for character entry, as described above.

At a decision step 616, authentication UI engine 506 may determine whether the submit button 103 (shown in FIG. 1A) has been selected. When, at the decision step 616, the authentication UI engine 506 determines that the submit button 103 has been selected, the routine 600 may proceed to a step 618, at which the authentication UI engine 506 may send a request to the keystroke monitoring engine 508 to return keystroke timing data for the various characters that were entered into one or more of the text boxes 102. When, on the other hand, the authentication UI engine 506 determines (at the decision step 616) that the submit button 103 has not been selected, the routine 600 may instead return to the decision step 608, at which the authentication UI engine 506 may again determine whether a new text box 102 has been selected for character entry, as described above.

At a decision step 620, the authentication UI engine 506 may await receipt of the requested keystroke timing data, as possibly also context data concerning the circumstances in which such keystroke timing data was measured, e.g., an identifier of the client device and/or keyboard that was used to enter the characters, one or more words in which the character-to-character transitions reflected in the keystroke timing data appeared, etc., from the keystroke monitoring engine 508.

After the keystroke timing data and context data (if any) are received from the keystroke monitoring engine 508, the routine 600 may proceed to a step 622, at which the authentication UI engine 506 may send the received keystroke timing data and context data (if any) to the keystroke evaluation engine 512 for processing to determine and/or confirm the identity of the user who typed the characters into one or more of the text boxes 102. As noted above, an example routine 1100 that may be performed by the keystroke evaluation engine 512 for that purpose is described below in connection with FIG. 11.

As also described below in connection with FIG. 11, in some implementations, the keystroke evaluation engine 512 may additionally be configured to determine and/or confirm the identity of the user who typed the characters into one or more of the text boxes 102 by determining whether the characters that were input into such text box(es) 102 match stored access credentials associated with the user, such as a username and/or password. Accordingly, in such implementations, at a step 624 of the routine 600, the authentication UI engine 506 may additionally send the string(s) of input characters that were input into one or more of the text boxes 102 to the keystroke evaluation engine 512, thus enabling the keystroke evaluation engine 512 to perform that additional evaluation.

At a decision step 626 of the routine 600, the authentication UI engine 506 may determine whether the keystroke evaluation engine 512 has determined and/or confirmed the identity of the user operating the keyboard 108 based on the keystroke timing data and context data sent at the step 622, and possibly also the input characters sent at the step 624.

When, at the decision step 626, the authentication UI engine 506 is notified by the keystroke evaluation engine 512 that the user's identity has been determined and/or confirmed, the routine 600 may proceed to a step 628, at which the authentication UI engine 506 may permit one or more resources associated with the authentication screen 100 to be accessed. When, on the other hand, the authentication UI engine 506 is notified by the keystroke evaluation engine 512 that the user's identity has not been determined and/or confirmed, the routine 600 may instead proceed to a step 630, at which the authentication UI engine 506 may cause the authentication screen 100 to present a message indicating the failure to identify and/or authenticate the user, and perhaps suggesting that the user attempt to re-enter characters into one or more of the text boxes 102. For instance, if the keystroke evaluation engine 512 determined that the keystroke timing data based on the user's typing of characters into the text box 102c (e.g., in response to the prompt 104) did not match stored keystroke behavior data associated with the user, the authentication UI engine 506 may present a message indicating that the user should try re-typing the characters identified by the prompt 104 into the text box 102c. In some implementations, authentication UI engine 506 may additionally select and display a different prompt 104 (e.g., per the steps 604 and 606) for the user to type on the subsequent attempt.

As noted above, FIG. 7 shows an example routine 700 that may be performed by the keystroke monitoring engine 508 shown in FIG. 5. As shown, the routine 700 may begin when, at a decision step 702, the keystroke monitoring engine 508 determines that an instruction to begin recording keystroke timing data for a text box has been received from the authentication UI engine 506.

At a decision step 704 of the routine 700, the keystroke monitoring engine 508 may determine whether a new keystroke within a sequence of keystrokes (i.e., that is preceded by at least one other keystroke) has occurred with respect to a keyboard 108. In some implementations, for example, the keystroke monitoring engine 508 may determine that new keystrokes have occurred in response to receiving notifications of keypress events for a mechanical keyboard or touchstart events for a soft keyboard.

When, at the decision step 704, the keystroke monitoring engine 508 determines that a new keystroke within a sequence of keystrokes has occurred, the keystroke monitoring engine 508 may record keystroke timing data based on temporal information associated with new keystroke as well as the keystroke that immediately preceded it. For example, as discussed above in connection with FIG. 1C, in some implementations, the keystroke monitoring engine 508 may register to receive notifications of keyboard events, and based on timestamps of received keyboard event notifications, the keystroke monitoring engine 508 may determine one or more of (A) "down intervals" (indicated as "$D_{int}$") for the respective characters that are typed, (B) "up intervals" (indicated as "$D_{up}$") between pairs of typed characters, (C) "down-to-down intervals" (indicated as "$D-D_{int}$") between the beginning times of adjacent "down intervals," and (D) "up-to-up intervals" (indicated as "$U-U_{int}$") between the beginning times of adjacent "up intervals."

FIG. 8 shows two examples of keystroke timing data that may be recorded by the keystroke monitoring engine 508 based on the timestamps shown in FIG. 1C. In particular, as illustrated in FIG. 8, in response to determining that a keystroke for the character "o" occurred following a keystroke for the character "C," the values of one or more of the above-noted intervals (i.e., "up intervals," "down intervals," a "down-to-down interval," and/or an "up-to-up interval") may be calculated based on the timestamps $t_1$, $t_2$, $t_3$, and $t_4$. Similarly, as also illustrated in FIG. 8, in response to determining that a keystroke for the character "B" occurred following a keystroke for a blank space, the values of one or more of the above-noted intervals (i.e., "up intervals," "down intervals," a "down-to-down interval," and/or an "up-to-up interval") may be calculated based on the timestamps $t_5$, $t_6$, $t_7$, and $t_8$. It should be appreciated that, in other implementations, the recorded keystroke timing data may instead simply include the timestamps themselves, with calculations to determine one or more of the various indicated intervals based on those timestamps being left to one or more downstream components, e.g., the keystroke profile management engine 510 and/or the keystroke evaluation engine 512.

Following the step 706, the routine 700 may proceed to a decision step 708 (described below). The decision step 708 may also be reached when, at the decision step 704, the keystroke monitoring engine 508 determines that a new keystroke within a sequence of keystrokes has not occurred.

At the decision step 708, the keystroke monitoring engine 508 may determine whether a request for recorded keystroke timing data has been received from the authentication UI engine 506, e.g., per the step 618 of the routine 600 described above. When, at the decision step 708, the keystroke monitoring engine 508, determines that such a request has been received, the routine 700 may proceed to a step 710 (described below). When, on the other hand, the keystroke monitoring engine 508, determines (at the decision step 708) that such a request has not been received, the routine 700 may instead return to the decision step 704 to continue monitoring for new keystrokes with respect to the indicated text box 102.

At the step 710 of the routine 700, the keystroke monitoring engine 508 may send a request to the context determination engine 514 for context data indicative of one or more circumstances in which the keystroke timing data is being collected. As noted above, an example routine 1200 that may be performed by the context determination engine 514 for that purpose is described below in connection with FIG. 12.

Per a decision step 712, after the keystroke monitoring engine 508 has received context data (if any) from the context determination engine 514, the routine 700 may proceed to a step 714, at which the keystroke monitoring engine 508 may send the recorded keystroke timing data and the context data received from the context determination engine 514 to the authentication UI engine 506. As discussed above in connection with the step 622 of the routine 600, in some implementations, the authentication UI engine 506 may then send that data to the keystroke evaluation engine 512 for comparison against stored keystroke behavior data. Again, an example routine 1100 that may be performed by the keystroke evaluation engine 512 for such purposes is described below in connection with FIG. 11.

At a step 716 of the routine 700, the keystroke monitoring engine 508 may also send the recorded keystroke timing data and the context data received from the context determination engine 514 to the keystroke profile management engine 510, so that such data may be used to augment the collection of keystroke timing data for the user operating the keyboard 108 from which the newly-detected keystrokes originated, as well as to update the keystroke behavior data for that user. As noted above, an example routine 900 that may be performed by the keystroke profile management engine 510 for such purposes is described below in connection with FIG. 9.

Figure 9:
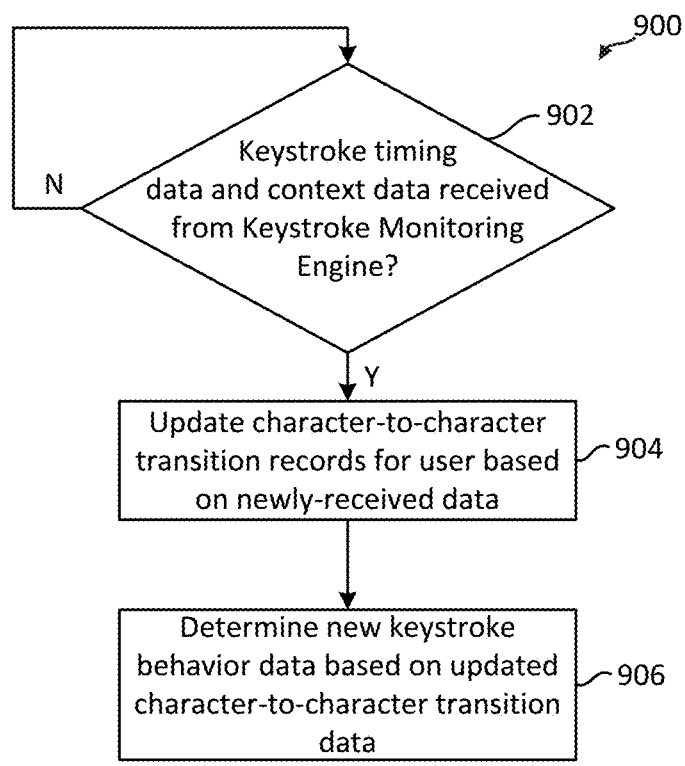
FIG. 9 shows an example routine that may be performed by the keystroke profile management engine shown in FIG. 5.

As shown in FIG. 9, the routine 900 may begin when, at a decision step 902, the keystroke profile management engine 510 receives keystroke timing data and context data from the keystroke monitoring engine 508. As noted above, in some implementations, the keystroke monitoring engine 508 may have sent such data to the keystroke profile management engine 510 per the step 716 of the routine 700 (shown in FIG. 7).

At the step 904 of the routine 900, the keystroke profile management engine 510 may use the received keystroke timing data and context data to update records it maintains for respective character-to-character transitions for keystrokes entered by a particular user in one or more particular contexts. The tables 114 shown in FIG. 1D illustrated two examples of such records that may be maintained by the keystroke profile management engine 510. In particular, the table 114a illustrates an example record maintained for a user "U1" in a context "C1" for that user's typing transitions between the character "C" and the character "o," and the table 114b illustrates an example record maintained for the same user in the same context but for that user's typing transitions between the spacebar character and the character "B."

As shown in FIG. 1D, in the illustrated example, the keystroke timing data recorded by the keystroke monitoring engine 508 in the table 800 (shown in FIG. 8) and sent to the keystroke profile management engine 510 (per the step 716 of the routine 700) may be added as additional rows (e.g., the rows with indexes "m" and "n," respectively) in the tables 114a, 114b maintained by the keystroke profile management engine 510. As also shown in FIG. 1D, in some implementation, the context data determined by the context determination engine 514 and provided to the keystroke profile management engine 510 (e.g., also per the step 716 of the routine) may additionally be written to the tables 114.

At a step 906 of the routine 900, the keystroke profile management engine 510 may determine new keystroke behavior data for the indicated user and the indicated context based on the new character-to-transition data that was added to the tables 114 for that user and that context. As noted above, the table 1000 (shown in FIG. 10) illustrates examples of keystroke behavior data that may be calculated and stored for a particular user (i.e., the user "U1") and a particular context (i.e., the context "C1") based on the data accumulated in the tables 114.

As noted above in Section A, the accumulated keystroke timing data (e.g., as stored in the tables 114) may be processed in any of a number of ways to determine keystroke behavior data for respective character-to-character transitions. For instance, as previously noted, in some implementations, for respective tables 114 that correspond to different character-to-character transitions in a particular context (e.g., using a particular client device 202 and/or keyboard 108, where the character-to-character transitions appeared within a particular word, etc.), average values may be calculated for individual columns of those tables 114. In some implementations, such average values may represent an average of all previously recorded rows, or all rows recorded over some particular time period (e.g., one month in the past). Alternatively, such average values may represent a moving average of the most recent "X" rows recorded. Further, in some implementations, more recent rows may be given more weight that older rows when calculating averages, such as by calculating weighted moving averages or exponential moving averages of the accumulated data.

In any event, once the keystroke behavior data is determined and stored (e.g., in the table 1000), portions of that keystroke behavior data may subsequently be accessed (e.g., by the keystroke evaluation engine 512) and compared to newly-received keystroke timing data for a newly-input sequence of characters (e.g., typed into one of the text boxes 102 shown in FIG. 1A) to determine and/or verify the identity of a user who typed those characters. An example routine 1100 that may be performed by the keystroke evaluation engine 512 for that purpose will now be described with reference to FIG. 11.

Figure 11:
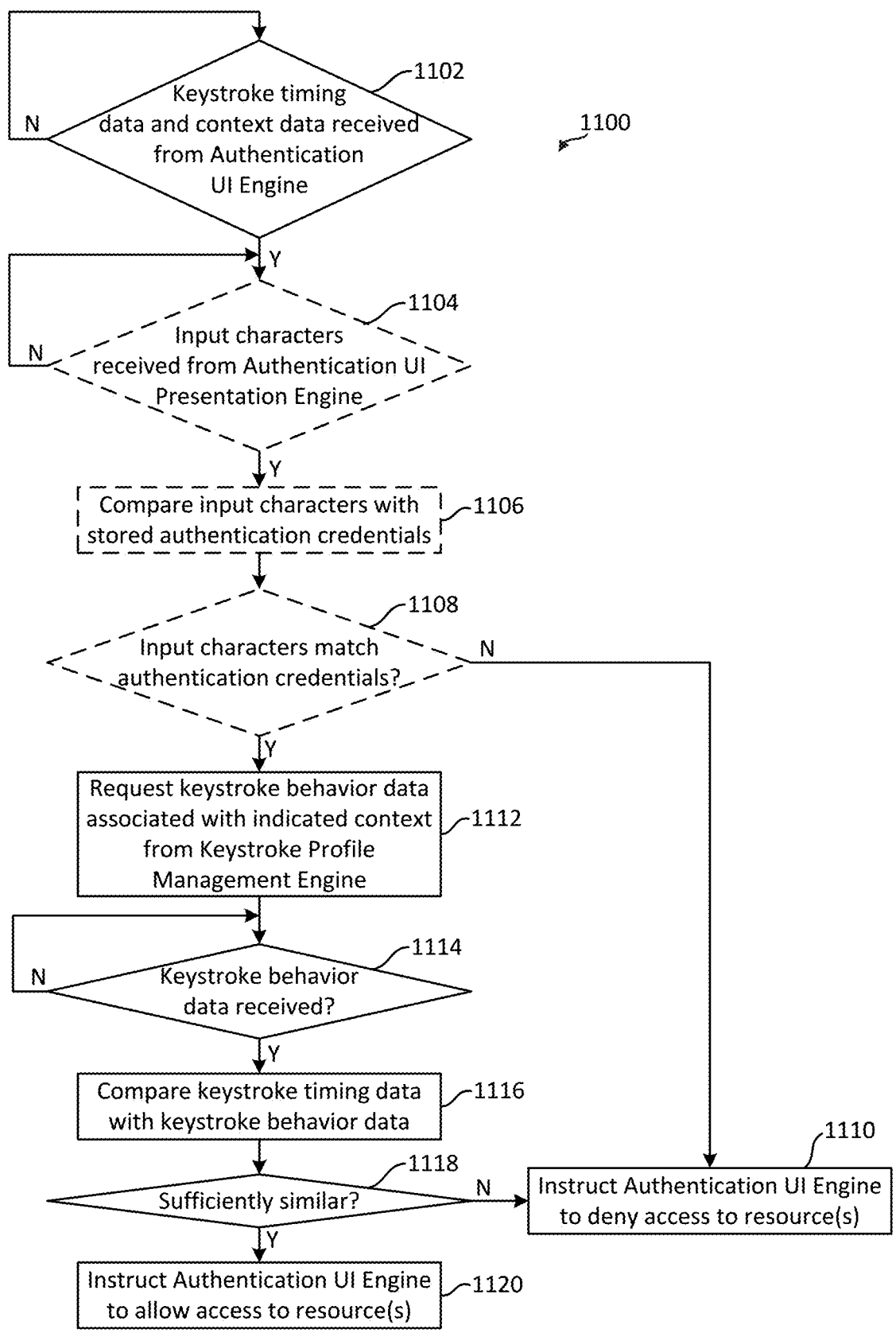
FIG. 11 shows an example routine that may be performed by the keystroke evaluation engine shown in FIG. 5.

As shown in FIG. 11, the routine 100 may begin when, at a decision step 1102, the keystroke evaluation engine 512 receives keystroke timing data and context data from the authentication UI engine 506. As noted above, the authentication UI engine 506 may have sent that data to the keystroke evaluation engine 512 per the step 622 of the routine 600 (shown in FIG. 6). As also shown in FIG. 11, in some implementations, the keystroke evaluation engine 512 may additionally await (per a decision step 1104) the receipt of the characters that were input by the user into one or more of the text boxes 102 prior to proceeding further. As also noted above, the authentication UI engine 506 may have sent those characters to the keystroke evaluation engine 512 per the step 624 of the routine 600 (shown in FIG. 6).

In implementations in which some or all of the input characters (e.g., a username and/or password) are received by the keystroke evaluation engine 512, the keystroke evaluation engine 512 may, at a step 1106, compare those received characters with stored authentication credentials for the user. In such implementations, when the keystroke evaluation engine 512 determines (per a decision step 1108) that the received characters do not match the stored authentication credentials for the user, the routine 1100 may proceed to a step 1110, at which the keystroke evaluation engine 512 may send a message to or otherwise instruct the authentication UI engine 506 to deny access to one or more resources associated with the authentication screen 100. As was described above in connection with the routine 600 (shown in FIG. 6), in response to such an instruction, the authentication UI engine 506 may, per a step 630, cause the authentication screen 100 to present a message indicating the failure to identify and/or authenticate the user, and perhaps suggesting that the user attempt to re-enter characters into one or more of the text boxes 102.

When, at the decision step 1108, the keystroke evaluation engine 512 determines that the received characters do match the stored authentication credentials for the user, or if the steps 1104, 1106 and 1108 are omitted, the routine 1100 may proceed to a step 1112, at which the keystroke evaluation engine 512 may request pertinent keystroke behavior data from the keystroke profile management engine 510, and may await (per a decision step 1114) receipt of the requested keystroke behavior data from the keystroke profile management engine 510 prior to proceeding to a step 1116. For instance, if the user enters a particular username in the text box 102a (shown in FIG. 1A), the keystroke evaluation engine 512 may request keystroke behavior data that is associated with the indicated username from the keystroke profile management engine 510. In other implementations, the keystroke evaluation engine 512 may simply have access to all of the keystroke behavior data that is maintained by the keystroke profile management engine 510. For example, the keystroke profile management engine 510 and the keystroke evaluation engine 512 may both have access to the same database (e.g., the database 520 shown in FIG. 5), and the keystroke profile management engine 510 may store the keystroke behavior data it generates in that database so as to make that data accessible to the keystroke evaluation engine 512.

In any event, at a step 1116, the keystroke evaluation engine 512 may compare the keystroke timing data (received from the authentication UI engine 506 per the decision step 1102) with retrieved and/or accessible keystroke behavior of one or more individuals (e.g., as stored in one or more tables 1000—shown in FIG. 10) to assess whether the keystroke timing data is sufficiently similar to the keystroke behavior data of any one individual to warrant a determination that the person whose keystrokes generated the new keystroke timing data is likely the same person whose prior keystrokes resulted in the generation of the keystroke behavior data. As noted above, in some implementations, the context data received from authentication UI engine 506 may be used to identify a particular subset of the keystroke behavior data for one or more users that is to be used for the comparison performed at the step 1106. For instance, if the received context data indicates that the received keystroke timing data was acquired in a certain contextual circumstance, e.g., by a particular keyboard 108 and/or client device 202, or where the character-to-character transitions occurred within a particular word, the keystroke evaluation engine 512 may use only the stored keystroke behavior data associated with that same context for such a comparison. The "context" entries 1002 in the table 1000 (which may correspond to the "context" entries 118 in the tables 114—shown in FIG. 1D) may, for example, be used to select the keystroke behavior data that is associated with a particular contextual circumstance.

In some implementations, as noted above, the keystroke evaluation engine 512 may receive a username or other identifier of the individual who is attempting to authenticate to the system 106, and may thus retrieve or otherwise access stored user keystroke behavior data associated with that identifier (e.g., based on the "user" entries 1004 in the table(s) 1000) for use in authenticating the individual operating the keyboard 108. In some such implementations, the identity of an individual operating a keyboard may be determined based solely on the characters of username typed into the text box 102a (shown in FIG. 1A) together with the keystroke timing data that was measured for the typing of those characters. In other such implementations, keystroke behavior data associated with a username may additionally or alternatively be used to determine and/or verify the identity of an individual operating a keyboard 108 by comparing that keystroke behavior data to keystroke timing data measured for the typing of a password into the text box 102b and/or the typing of sequence of characters corresponding to a prompt 104 into the text box 102c.

In other implementations, the keystroke evaluation engine 512 may not have received an identifier (e.g., a username) that can be used to retrieve or otherwise access keystroke behavior data for a particular individual, and thus may need to compare the keystroke timing data received from the authentication UI engine 506 to a broader collection of keystroke behavior data associated with multiple individuals, such a group of employees of an organization. For instance, in some implementations, only the characters typed into the text box 102c (e.g., based on a prompt 104) may be used to determine the identity of the person operating a keyboard 108. In some such implementations, for instance, the keystroke timing data received from the authentication UI engine 506 may be compared against keystroke behavior data for a large number of individuals to determine whether the newly-received keystroke timing data is sufficiently similar to the keystroke behavior data of any one of those individuals to warrant a determination that the person whose keystrokes generated the new keystroke timing data is likely the same person whose prior keystrokes resulted in the generation of the keystroke behavior data of that individual.

Further, even in implementations where a username or other identifier of the individual purportedly operating the keyboard is provided, thus enabling the keystroke evaluation engine 512 to retrieve or otherwise access keystroke behavior data based on that identifier, the keystroke evaluation engine 512 may still, in at least some circumstances, compare the received keystroke timing data against a wider set of keystroke behavior data for other individuals, so as to determine whether one of those other individuals might be attempting to authenticate to the system 106 using the username or other identifier of another person. In such circumstances, if a sufficiently similar match is found between the received keystroke timing data and the keystroke behavior data of an individual other the one indicated by the input username, the system 106 may determine to deny access to one or more resources to the user operating the keyboard, even if the keystroke evaluation engine 512 determines that the newly-received keystroke timing data is within a threshold degree of similarity to the keystroke behavior data associated with the input username.

As noted in Section A, any of a number of techniques may be employed to evaluate the degree of similarity between the newly-acquired keystroke timing data and the applicable keystroke behavior data. For example, in some implementations, for the respective character-to-character transitions that appear in the newly-typed sequence of characters, differences between values of newly measured temporal characteristics and the values for those same characteristics in the keystroke behavior data may be determined, and a sum of those differences for all of the character-to-character transitions in the newly-typed sequence may be calculated. In some implementations, the system 106 may determine that the person who typed the newly-typed characters is the same person who is associated with the keystroke behavior data, e.g., if that sum of differences is below a threshold number. Other, and perhaps more sophisticated techniques, may additionally or alternatively be used in other implementations, such as by applying different weights to different temporal characteristics, applying different weights to certain regions of the newly-typed character sequence (e.g., the characters that are near the middle of the newly-typed character sequence), etc.

When, at a decision step 1118, the keystroke evaluation engine 512 determines that the received keystroke timing data (e.g., as indicated in the table 800 of FIG. 8) is sufficiently similar to the applicable keystroke behavior data (e.g., as indicated in the table 1000 of FIG. 10), the keystroke evaluation engine 512 may proceed to a step 1120, at which the keystroke evaluation engine 512 may instruct the authentication UI engine 506 to permit the client device 202 to access one or more resources associated with the authentication screen 100. When, on the other hand, the keystroke evaluation engine 512 determines (at the decision step 1118) that the received keystroke timing data (e.g., as indicated in the table 800 of FIG. 8) is not sufficiently similar to the applicable keystroke behavior data (e.g., as indicated in the table 1000 of FIG. 10), the keystroke evaluation engine 512 may instead proceed to the step 1110, at which the keystroke evaluation engine 512 may instruct the authentication UI engine 506 to deny access to such resource(s), as described above.

As noted above, FIG. 12 shows an example routine 1200 that may be performed by the context determination engine 514 described above in connection with FIG. 5. As shown, the routine 1200 may begin when, at a decision step 1202, the context determination engine 514 receives a request for context data from the keystroke monitoring engine 508. For example, as discussed above, in some implementations, the keystroke monitoring engine 508 may have sent a request for such data to the context determination engine 514, e.g., per the step 710 of the routine 700 (shown in FIG. 7). As noted above, the context data that the context determination engine 514 determines and sends to the keystroke monitoring engine 508 may take on any of numerous forms and may be determined in any of a number of ways. The following discussion highlights only a sampling of the various types of context data that could be determined. Accordingly, it should be appreciated that, in various embodiments, fewer than all of the illustrated types of context data may be collected and/or different types of context data may be additionally or alternatively be collected. Certain types of context data may be collected, for example, based on the content of event notifications received from the operating system of the client device 202 on which the context determination engine 514 is executing.

At a step 1204 of the routine 1200, the context determination engine 514 may determine the type of keyboard that is being used to enter characters in a text box 102. For instance, with reference to FIG. 1B, the context determination engine 514 may determine whether the keyboard 108 is a mechanical peripheral keyboard 108*a*, a built-in keyboard 108*b* of a laptop computer, or a soft keyboard 108*c* of a smartphone, tablet, etc.

At a step 1206 of the routine 1200, the context determination engine 514 may determine a device identifier of the client device 202 being monitored. In some implementations, individual client devices 202 may be assigned respective unique identifiers and the context determination engine 514 may simply return such a device identifier to the keystroke monitoring engine 508.

At a step 1208 of the routine 1200, the context determination engine 514 may determine a keyboard identifier for the particular keyboard 108 that is being used to input characters into a text box 102. In some implementations, individuals keyboards 108 may be assigned respective unique identifiers and the context determination engine 514 may simply return such a keyboard identifier to the keystroke monitoring engine 508. The use of a keyboard identifier in addition to or in in lieu of a client device identifier may be useful, for example, in circumstances where a user sometimes connects a laptop computer to a docking station and uses a peripheral mechanical keyboard, rather than the laptop computer's built-in keyboard, to interact with the laptop computer.

At a step 1210 of the routine 1200, the context determination engine 514 may determine the particular words and/or phrases in which respective character-to-character transitions (for which keystroke timing data was determined) appeared. Acquiring this type of context data may be particularly useful in some implementations, as some users may tend to type the same two characters with different timings when those characters appear in different words. For example, a particular user may have difficult remembering whether the word "traveling" has one or two L's, and for that reason may tend to pause momentarily while pressing the key for the letter L when typing that particular word. The same user, however, may have no difficulty remembering whether the word "elevator" has just one L, and may thus not pause in the same manner while typing the letter L for that word. Accordingly, by determining context data indicating the particular words in which different "e" to "l" transitions occurred, and segregating and comparing keystroke timing data and keystroke behavior data based on that word-specific context data, more accurate determinations of user identities may be achieved.

At a step 1212 of the routine 1200, the context determination engine 514 may determine a current location of the client device 202. The location of the client device 202 may be determined, for example, using a global positioning system (GPS) component, one or more networks to which the client device 202 is connected, one or more wireless networks signals detected by the client device 202, etc. Users may exhibit slightly different typing behavior when operating a client device 202 at different locations (e.g., in the office versus at home), and context data that is indicative of such locations may be helpful in selecting the most appropriate keystroke behavior data to compare with the keystroke timing data being measured by the keystroke monitoring engine 508.

At a step 1214 of the routine 1200, the context determination engine 514 may determine a current time of day, e.g., by referencing a clock of the client device 202. Users may exhibit slightly different typing behavior when operating a client device 202 at different times of day (e.g., in the morning versus the late afternoon or evening), and context data indicative of the time of day that keystroke timing data is collected may be helpful in selecting the most appropriate keystroke behavior data to compare with the keystroke timing data being measured by the keystroke monitoring engine 508.

At a step 1216 of the routine 1200, the context determination engine 514 may send one or more items of determined context data to the keystroke monitoring engine 508.

As mentioned above, in some implementations, one or more sensor 518 (shown in FIG. 5) may be used to monitor one or more additional or different aspects of how a person interacts with a keyboard 108. When employed, such sensor(s) 518 may, for example, include one or more cameras configured to monitor things likes how high a user's fingers are raised when striking keys, which fingers are used to strike which keys, etc. Additionally or alternatively, such sensor(s) 518, when employed, may include one or more microphones configured to monitor things like how loudly the user strikes respective keys, whether and which sounds are enabled for a soft keyboard, etc. In some implementations, the additional or different data accumulated by such sensor(s) 518 may be recorded along with, or in lieu of, the keystroke timing data discussed herein, and may then be used to determine and/or verify the identity of a user operating a keyboard 108 on a subsequent occasion. For instance, similar to the determination of keystroke behavior data that is indicative of how a user typically interacts with a keyboard when typing, data from one or more such sensor(s) may be accumulated over time to determine a data set that is indicative of things like how high a user typically raises fingers when typing particular characters, which fingers typically strike which keys, how loudly the user typically strikes particular keys, etc. And similar to the comparison of newly-acquired keystroke timing data to stored keystroke behavior data, newly-acquired sensor data may be compared to that data set to determine and/or verify the identity of a user.

Further, as also mentioned above, in some implementations, user identification/confirmation based on typing behavior may be performed in contexts other than authenticating the identity of the user to determine whether to grant access to one or more resources. For example, in some implementations, keystroke monitoring engine 508 may monitor the typing behavior of one or more users as a background process as the users normally interact with a keyboard to perform ordinary tasks. The identity of such users may be somehow determined, such as by monitoring which user is currently logged into a computer, by using one or more cameras of the computer to perform facial recognition, etc. Pursuant to such monitoring, keystroke timing data (such as described herein) may be accumulated and stored in association with user identifiers, and may be processed to determine keyboard behavior data that is indicative of the typical typing characteristics of the respective users. Once such keystroke behavior data has been determined for one or more users, the same or a different application may subsequently monitor a user's typing behavior when interacting with a keyboard to determine newly-acquired keystroke timing data, and that newly-acquired keystroke timing data may be compared with the stored keystroke behavior data to determine which user is currently operating the keyboard. Determining the identity of the current user in this fashion may be useful, for example, to determine how to customize one or more features of the application and/or the client device to comport with one or more settings that are indicated in a profile of the identified user.

As another example, a keystroke monitoring engine 508 may similarly accumulate keystroke timing data for a particular user while that user interacts with a keyboard 108 while using at least one, and possibly a variety of applications, such as chat applications (e.g., Skype), word processors (e.g., notepad), integrated development environments (IDEs) (e.g., Eclipse), etc., during an initial "training" period. After a sufficient amount of historical keystroke timing data has been accumulated, e.g., one or two weeks-worth of data, the system 106 may enter a "protection" mode during which newly-acquired keystroke timing data may be sent to a keystroke evaluation engine 512 to determine whether the same user is operating the keyboard 108. In the event that the keystroke evaluation engine 512 determines that the newly-acquired keystroke timing data is inconsistent with stored keystroke behavior data for the user, remedial action can be taken, such as logging out the user from one or more applications, and requiring the user to enter a password or take another action to authenticate to the system 106. By using such a technique, a bad actor who attempts to operate another user's client device 202 while it is unlocked (e.g., perhaps the user momentarily stepped away from a client device 202 after logging on to it) may be detected and blocked from having such access.

F. Example Implementations of Methods, Systems, and Computer-Readable Media in Accordance with the Present Disclosure The following paragraphs (M1) through (M22) describe examples of methods that may be implemented in accordance with the present disclosure.

(M1) A method may be performed that involves determining, by a computing system on a first occasion, that a first user typed a first sequence of characters including at least a first character followed by a second character; determining, by the computing system, first data that is based at least in part on a first time interval between first and second interactions by the first user with a keyboard while typing the first character and the second character within the first sequence of characters; determining, by the computing system on a second occasion, that a person typed a second sequence of characters including at least the first character followed by the second character, the second sequence of characters being different than the first sequence of characters; determining, by the computing system, second data that is based at least in part on a second time interval between third and fourth interactions by the person with a keyboard while typing the first character and the second character within the second sequence of characters; and determining, by the computing system, that the person is the first user based at least in part on the first data and the second data.

(M2) A method may be performed as described in paragraph (M1), and may further involve prompting the person to enter an authentication credential into a text box to establish that the person is the first user; and determining that the person typed the second sequence of characters into the text box.

(M3) A method may be performed as described in paragraph (M1) or paragraph (M2), wherein determining the first data may further involve determining a first duration of the first time interval based at least in part on a first time at which the first user ceased pressing a first key for the first character while typing the first sequence of characters; and determining the second data may further involve determining a second duration of the second time interval based at least in part on a second time at which the person ceased pressing the first key for the first character while typing the second sequence of characters.

(M4) A method may be performed as described in paragraph (M3), wherein determining the first duration of the first time interval may further involve determining an amount of time that elapsed between a second time at which the first user initially pressed the first key for the first character while typing the first sequence of characters and the first time.

(M5) A method may be performed as described in paragraph (M3), wherein determining the first duration of the first time interval may further involve determining an amount of time that elapsed between the first time and a second time at which the first user initially pressed a second key for the second character while typing the first sequence of characters.

(M6) A method may be performed as described in any of paragraphs (M1) through (M5), and may further involve causing, by the computing system, a display screen to present the second sequence of characters before the person types the second sequence of characters.

(M7) A method may be performed as described in any of paragraphs (M1) through (M6), and may further involve storing, by the computing system and in association with the first data, an indicator of a first context in which the first time interval was determined; determining, by the computing system, that a second context in which the second time interval was determined corresponds to the first context indicated by the stored indicator; and determining, based at least in part on the second context corresponding to the first context indicated by the stored indicator, to compare the second data with the first data to determine whether the person is the first user.

(M8) A method may be performed as described in paragraph (M7), and may further involve determining that the first character and the second character in the first sequence of characters were both included in a first word typed by the first user; and determining, based at least in part on the first character and the second character in the first sequence of characters both being included in the first word, that the first context corresponds to inclusion of the first character and the second character in the first word.

(M9) A method may be performed as described in paragraph (M7) or paragraph (M8), and may further involve determining at least one characteristic of the keyboard operated by the first user while typing the first sequence of characters; and determining that the first context corresponds to the at least one characteristic.

(M10) A method may be performed that involves determining, by a computing system, that a user typed a sequence of characters including at least a first character followed by a second character; determining, by the computing system, a duration of at least a first time interval measured based at least in part on a first time at which the user ceased pressing a first key for the first character while typing the sequence of characters; and determining, by the computing system, an identity of the user based at least in part on the duration of the first time interval.

(M11) A method may be performed as described in paragraph (M10), wherein determining the duration of the first time interval may further involve determining an amount of time that elapsed between a second time at which the user initially pressed the first key for the first character while typing the sequence of characters and the first time.

(M12) A method may be performed as described in paragraph (M10), wherein determining the duration of the first time interval may further involve determining an amount of time that elapsed between the first time and a second time at which the user initially pressed a second key for the second character while typing the sequence of characters.

(M13) A method may be performed as described in any of paragraphs (M10) through (M12), and may further involve prompting the user to enter an authentication credential into a text box to authenticate an identity of the user; and determining that the user typed the sequence of characters into the text box.

(M14) A method may be performed as described in any of paragraphs (M10) through (M13), and may further involve causing, by the computing system, a display screen to present the sequence of characters before the user types the sequence of characters.

(M15) A method may be performed that involves causing, by a computing system, a display screen to present a first sequence of characters that are to be typed by a user to authenticate an identity of the user; determining, by the computing system after the first sequence of characters have been presented on the display screen, first data that is based at least in part on a first time interval between first and second interactions by the user with a keyboard while typing the first sequence of characters; and authenticating, by the computing system, the identity of the user based at least in part on the first data.

(M16) A method may be performed as described in paragraph (M15), wherein determining the first data may further involve determining a first duration of the first time interval based at least in part on a first time at which the user ceased pressing a first key for a first character while typing the first sequence of characters.

(M17) A method may be performed as described in paragraph (M16), wherein determining the first duration of the first time interval may further involve determining an amount of time that elapsed between a second time at which the user initially pressed the first key for the first character while typing the first sequence of characters and the first time.

(M18) A method may be performed as described in paragraph (M16), wherein determining the first duration of the first time interval may further involve determining an amount of time that elapsed between the first time and a second time at which the user initially pressed a second key for a second character while typing the first sequence of characters.

(M19) A method may be performed as described in any of paragraphs (M15) through (M18), and may further involve causing, by the computing system, the display screen to further present a text box into which the user is to type the presented first sequence of characters to authenticate the identity of the user; and determining that the user typed the first sequence of characters into the text box.

(M20) A method may be performed that involves determining, by a computing system on a first occasion, that a first user typed a first sequence of characters including at least a first character followed by a second character; determining, by the computing system, first data that is based at least in part on a first time interval between first and second interactions by the first user with a keyboard while typing the first character and the second character within the first sequence of characters; storing, by the computing system and in association with the first data, an indicator of a first context in which the first time interval was determined; determining, by the computing system on a second occasion, that a person typed a second sequence of characters including at least the first character followed by the second character; determining, by the computing system, second data that is based at least in part on a second time interval between third and fourth interactions by the person with a keyboard while typing the first character and the second character within the second sequence of characters; determining, by the computing system, that a second context in which the second time interval was determined corresponds to the first context indicated by the stored indicator; determining, based at least in part on the second context corresponding to the first context indicated by the stored indicator, to compare the second data with the first data to determine whether the person is the first user; and determining, by the computing system, that the person is the first user based at least in part on a comparison of the second data to the first data.

(M21) A method may be performed as described in paragraph (M20), and may further involve determining that the first character and the second character in the first sequence of characters were both included in a first word typed by the first user; and determining, based at least in part on the first character and the second character in the first sequence of characters both being included in the first word, that the first context corresponds to inclusion of the first character and the second character in the first word.

(M22) A method may be performed as described in paragraph (M20) or paragraph (M21), and may further involve determining at least one characteristic of the keyboard operated by the first user while typing the first sequence of characters; and determining that the first context corresponds to the at least one characteristic.

The following paragraphs (S1) through (S22) describe examples of systems and devices that may be implemented in accordance with the present disclosure.

(S1) A system may include at least one processor and at least one computer-readable medium encoded with instruction which, when executed by the at least one processor, causes the system to determine, on a first occasion, that a first user typed a first sequence of characters including at least a first character followed by a second character, to determine first data that is based at least in part on a first time interval between first and second interactions by the first user with a keyboard while typing the first character and the second character within the first sequence of characters, to determine, on a second occasion, that a person typed a second sequence of characters including at least the first character followed by the second character, the second sequence of characters being different than the first sequence of characters, to determine second data that is based at least in part on a second time interval between third and fourth interactions by the person with a keyboard while typing the first character and the second character within the second sequence of characters, and to determine that the person is the first user based at least in part on the first data and the second data.

(S2) A system may be configured as described in paragraph (S1), and the at least one computer-readable medium may be further encoded with additional instructions which, when executed by the at least one processor, further cause the system to prompt the person to enter an authentication credential into a text box to establish that the person is the first user, and to determine that the person typed the second sequence of characters into the text box.

(S3) A system may be configured as described in paragraph (S1) or paragraph (S2), and the at least one computer-readable medium may be further encoded with additional instructions which, when executed by the at least one processor, further cause the system to determine the first data at least in part by determining a first duration of the first time interval based at least in part on a first time at which the first user ceased pressing a first key for the first character while typing the first sequence of characters; and determining the second data may further involve determining a second duration of the second time interval based at least in part on a second time at which the person ceased pressing the first key for the first character while typing the second sequence of characters.

(S4) A system may be configured as described in paragraph (S3), and the at least one computer-readable medium may be further encoded with additional instructions which, when executed by the at least one processor, further cause the system to determine the first duration of the first time interval at least in part by determining an amount of time that elapsed between a second time at which the first user initially pressed the first key for the first character while typing the first sequence of characters and the first time.

(S5) A system may be configured as described in paragraph (S3), and the at least one computer-readable medium may be further encoded with additional instructions which, when executed by the at least one processor, further cause the system to determine the first duration of the first time interval at least in part by determining an amount of time that elapsed between the first time and a second time at which the first user initially pressed a second key for the second character while typing the first sequence of characters.

(S6) A system may be configured as described in any of paragraphs (S1) through (S5), and the at least one computer-readable medium may be further encoded with additional instructions which, when executed by the at least one processor, further cause the system to cause a display screen to present the second sequence of characters before the person types the second sequence of characters.

(S7) A system may be configured as described in any of paragraphs (S1) through (S6), and the at least one computer-readable medium may be further encoded with additional instructions which, when executed by the at least one processor, further cause the system to store, in association with the first data, an indicator of a first context in which the first time interval was determined, to determine that a second context in which the second time interval was determined corresponds to the first context indicated by the stored indicator, and to determine, based at least in part on the second context corresponding to the first context indicated by the stored indicator, to compare the second data with the first data to determine whether the person is the first user.

(S8) A system may be configured as described in paragraph (S7), and the at least one computer-readable medium may be further encoded with additional instructions which, when executed by the at least one processor, further cause the system to determine that the first character and the second character in the first sequence of characters were both included in a first word typed by the first user, and to determine, based at least in part on the first character and the second character in the first sequence of characters both being included in the first word, that the first context corresponds to inclusion of the first character and the second character in the first word.

(S9) A system may be configured as described in paragraph (S7) or paragraph (S8), and the at least one computer-readable medium may be further encoded with additional instructions which, when executed by the at least one processor, further cause the system to determine at least one characteristic of the keyboard operated by the first user while typing the first sequence of characters, and to determine that the first context corresponds to the at least one characteristic.

(S10) A system may include at least one processor and at least one computer-readable medium encoded with instruction which, when executed by the at least one processor, causes the system to determine that a user typed a sequence of characters including at least a first character followed by a second character, to determine a duration of at least a first time interval measured based at least in part on a first time at which the user ceased pressing a first key for the first character while typing the sequence of characters, and to determine an identity of the user based at least in part on the duration of the first time interval.

(S11) A system may be configured as described in paragraph (S10), and the at least one computer-readable medium may be further encoded with additional instructions which, when executed by the at least one processor, further cause the system to determine the duration of the first time interval at least in part by determining an amount of time that elapsed between a second time at which the user initially pressed the first key for the first character while typing the sequence of characters and the first time.

(S12) A system may be configured as described in paragraph (S10), and the at least one computer-readable medium may be further encoded with additional instructions which, when executed by the at least one processor, further cause the system to determine the duration of the first time interval at least in part by determining an amount of time that elapsed between the first time and a second time at which the user initially pressed a second key for the second character while typing the sequence of characters.

(S13) A system may be configured as described in any of paragraphs (S10) through (S12), and the at least one computer-readable medium may be further encoded with additional instructions which, when executed by the at least one processor, further cause the system to prompt the user to enter an authentication credential into a text box to authenticate an identity of the user, and to determine that the user typed the sequence of characters into the text box.

(S14) A system may be configured as described in any of paragraphs (S10) through (S13), and the at least one computer-readable medium may be further encoded with additional instructions which, when executed by the at least one processor, further cause the system to cause a display screen to present the sequence of characters before the user types the sequence of characters.

(S15) A system may include at least one processor and at least one computer-readable medium encoded with instruction which, when executed by the at least one processor, causes the system to cause a display screen to present a first sequence of characters that are to be typed by a user to authenticate an identity of the user, to determine, after the first sequence of characters have been presented on the display screen, first data that is based at least in part on a first time interval between first and second interactions by the user with a keyboard while typing the first sequence of characters, and to authenticate the identity of the user based at least in part on the first data.

(S16) A system may be configured as described in paragraph (S15), and the at least one computer-readable medium may be further encoded with additional instructions which, when executed by the at least one processor, further cause the system to determine the first data at least in part by determining a first duration of the first time interval based at least in part on a first time at which the user ceased pressing a first key for a first character while typing the first sequence of characters.

(S17) A system may be configured as described in paragraph (S16), and the at least one computer-readable medium may be further encoded with additional instructions which, when executed by the at least one processor, further cause the system to determine the first duration of the first time interval at least in part by determining an amount of time that elapsed between a second time at which the user initially pressed the first key for the first character while typing the first sequence of characters and the first time.

(S18) A system may be configured as described in paragraph (S16), and the at least one computer-readable medium may be further encoded with additional instructions which, when executed by the at least one processor, further cause the system to determine the first duration of the first time interval at least in part by determining an amount of time that elapsed between the first time and a second time at which the user initially pressed a second key for a second character while typing the first sequence of characters.

(S19) A system may be configured as described in any of paragraphs (S15) through (S18), and the at least one computer-readable medium may be further encoded with additional instructions which, when executed by the at least one processor, further cause the system to cause the display screen to further present a text box into which the user is to type the presented first sequence of characters to authenticate the identity of the user, and to determine that the user typed the first sequence of characters into the text box.

(S20) A system may include at least one processor and at least one computer-readable medium encoded with instruction which, when executed by the at least one processor, causes the system to determine, on a first occasion, that a first user typed a first sequence of characters including at least a first character followed by a second character, to determine first data that is based at least in part on a first time interval between first and second interactions by the first user with a keyboard while typing the first character and the second character within the first sequence of characters, to store, in association with the first data, an indicator of a first context in which the first time interval was determined, to determine, on a second occasion, that a person typed a second sequence of characters including at least the first character followed by the second character, to determine second data that is based at least in part on a second time interval between third and fourth interactions by the person with a keyboard while typing the first character and the second character within the second sequence of characters, to determine that a second context in which the second time interval was determined corresponds to the first context indicated by the stored indicator, to determine, based at least in part on the second context corresponding to the first context indicated by the stored indicator, to compare the second data with the first data to determine whether the person is the first user, and to determine that the person is the first user based at least in part on a comparison of the second data to the first data.

(S21) A system may be configured as described in paragraph (S20), and the at least one computer-readable medium may be further encoded with additional instructions which, when executed by the at least one processor, further cause the system to determine that the first character and the second character in the first sequence of characters were both included in a first word typed by the first user, and to determine, based at least in part on the first character and the second character in the first sequence of characters both being included in the first word, that the first context corresponds to inclusion of the first character and the second character in the first word.

(S22) A system may be configured as described in paragraph (S20) or paragraph (S21), and the at least one computer-readable medium may be further encoded with additional instructions which, when executed by the at least one processor, further cause the system to determine at least one characteristic of the keyboard operated by the first user while typing the first sequence of characters, and to determine that the first context corresponds to the at least one characteristic.

The following paragraphs (CRM1) through (CRM22) describe examples of computer-readable media that may be implemented in accordance with the present disclosure.

(CRM1) At least one non-transitory, computer-readable medium may be encoded with instructions which, when executed by at least one processor included in a system, cause the system to determine, on a first occasion, that a first user typed a first sequence of characters including at least a first character followed by a second character, to determine first data that is based at least in part on a first time interval between first and second interactions by the first user with a keyboard while typing the first character and the second character within the first sequence of characters, to determine, on a second occasion, that a person typed a second sequence of characters including at least the first character followed by the second character, the second sequence of characters being different than the first sequence of characters, to determine second data that is based at least in part on a second time interval between third and fourth interactions by the person with a keyboard while typing the first character and the second character within the second sequence of characters, and to determine that the person is the first user based at least in part on the first data and the second data.

(CRM2) At least one non-transitory computer-readable medium may be configured as described in paragraph (CRM1), and may be further encoded with additional instructions which, when executed by the at least one processor, further cause the system to prompt the person to enter an authentication credential into a text box to establish that the person is the first user, and to determine that the person typed the second sequence of characters into the text box.

(CRM3) At least one non-transitory computer-readable medium may be configured as described in paragraph (CRM1) or paragraph (CRM2), and may be further encoded with additional instructions which, when executed by the at least one processor, further cause the system to determine the first data at least in part by determining a first duration of the first time interval based at least in part on a first time at which the first user ceased pressing a first key for the first character while typing the first sequence of characters; and determining the second data may further involve determining a second duration of the second time interval based at least in part on a second time at which the person ceased pressing the first key for the first character while typing the second sequence of characters.

(CRM4) At least one non-transitory computer-readable medium may be configured as described in paragraph (CRM3), and may be further encoded with additional instructions which, when executed by the at least one processor, further cause the system to determine the first duration of the first time interval at least in part by determining an amount of time that elapsed between a second time at which the first user initially pressed the first key for the first character while typing the first sequence of characters and the first time.

(CRM5) At least one non-transitory computer-readable medium may be configured as described in paragraph (CRM3), and may be further encoded with additional instructions which, when executed by the at least one processor, further cause the system to determine the first duration of the first time interval at least in part by determining an amount of time that elapsed between the first time and a second time at which the first user initially pressed a second key for the second character while typing the first sequence of characters.

(CRM6) At least one non-transitory computer-readable medium may be configured as described in any of paragraphs (CRM1) through (CRM5), and may be further encoded with additional instructions which, when executed by the at least one processor, further cause the system to cause a display screen to present the second sequence of characters before the person types the second sequence of characters.

(CRM7) At least one non-transitory computer-readable medium may be configured as described in any of paragraphs (CRM1) through (CRM6), and may be further encoded with additional instructions which, when executed by the at least one processor, further cause the system to store, in association with the first data, an indicator of a first context in which the first time interval was determined, to determine that a second context in which the second time interval was determined corresponds to the first context indicated by the stored indicator, and to determine, based at least in part on the second context corresponding to the first context indicated by the stored indicator, to compare the second data with the first data to determine whether the person is the first user.

(CRM8) At least one non-transitory computer-readable medium may be configured as described in paragraph (CRM7), and may be further encoded with additional instructions which, when executed by the at least one processor, further cause the system to determine that the first character and the second character in the first sequence of characters were both included in a first word typed by the first user, and to determine, based at least in part on the first character and the second character in the first sequence of characters both being included in the first word, that the first context corresponds to inclusion of the first character and the second character in the first word.

(CRM9) At least one non-transitory computer-readable medium may be configured as described in paragraph (CRM7) or paragraph (CRM8), and may be further encoded with additional instructions which, when executed by the at least one processor, further cause the system to determine at least one characteristic of the keyboard operated by the first user while typing the first sequence of characters, and to determine that the first context corresponds to the at least one characteristic.

(CRM10) At least one non-transitory, computer-readable medium may be encoded with instructions which, when executed by at least one processor included in a system, cause the system to determine that a user typed a sequence of characters including at least a first character followed by a second character, to determine a duration of at least a first time interval measured based at least in part on a first time at which the user ceased pressing a first key for the first character while typing the sequence of characters, and to determine an identity of the user based at least in part on the duration of the first time interval.

(CRM11) At least one non-transitory computer-readable medium may be configured as described in paragraph (CRM10), and may be further encoded with additional instructions which, when executed by the at least one processor, further cause the system to determine the duration of the first time interval at least in part by determining an amount of time that elapsed between a second time at which the user initially pressed the first key for the first character while typing the sequence of characters and the first time.

(CRM12) At least one non-transitory computer-readable medium may be configured as described in paragraph (CRM10), and may be further encoded with additional instructions which, when executed by the at least one processor, further cause the system to determine the duration of the first time interval at least in part by determining an amount of time that elapsed between the first time and a second time at which the user initially pressed a second key for the second character while typing the sequence of characters.

(CRM13) At least one non-transitory computer-readable medium may be configured as described in any of paragraphs (CRM10) through (CRM12), and may be further encoded with additional instructions which, when executed by the at least one processor, further cause the system to prompt the user to enter an authentication credential into a text box to authenticate an identity of the user, and to determine that the user typed the sequence of characters into the text box.

(CRM14) At least one non-transitory computer-readable medium may be configured as described in any of paragraphs (CRM10) through (CRM13), and may be further encoded with additional instructions which, when executed by the at least one processor, further cause the system to cause a display screen to present the sequence of characters before the user types the sequence of characters.

(CRM15) At least one non-transitory, computer-readable medium may be encoded with instructions which, when executed by at least one processor included in a system, cause the system to cause a display screen to present a first sequence of characters that are to be typed by a user to authenticate an identity of the user, to determine, after the first sequence of characters have been presented on the display screen, first data that is based at least in part on a first time interval between first and second interactions by the user with a keyboard while typing the first sequence of characters, and to authenticate the identity of the user based at least in part on the first data.

(CRM16) At least one non-transitory computer-readable medium may be configured as described in paragraph (CRM15), and may be further encoded with additional instructions which, when executed by the at least one processor, further cause the system to determine the first data at least in part by determining a first duration of the first time interval based at least in part on a first time at which the user ceased pressing a first key for a first character while typing the first sequence of characters.

(CRM17) At least one non-transitory computer-readable medium may be configured as described in paragraph (CRM16), and may be further encoded with additional instructions which, when executed by the at least one processor, further cause the system to determine the first duration of the first time interval at least in part by determining an amount of time that elapsed between a second time at which the user initially pressed the first key for the first character while typing the first sequence of characters and the first time.

(CRM18) At least one non-transitory computer-readable medium may be configured as described in paragraph (CRM16), and may be further encoded with additional instructions which, when executed by the at least one processor, further cause the system to determine the first duration of the first time interval at least in part by determining an amount of time that elapsed between the first time and a second time at which the user initially pressed a second key for a second character while typing the first sequence of characters.

(CRM19) At least one non-transitory computer-readable medium may be configured as described in any of paragraphs (CRM15) through (CRM18), and may be further encoded with additional instructions which, when executed by the at least one processor, further cause the system to cause the display screen to further present a text box into which the user is to type the presented first sequence of characters to authenticate the identity of the user, and to determine that the user typed the first sequence of characters into the text box.

(CRM20) At least one non-transitory, computer-readable medium may be encoded with instructions which, when executed by at least one processor included in a system, cause the system to determine, on a first occasion, that a first user typed a first sequence of characters including at least a first character followed by a second character, to determine first data that is based at least in part on a first time interval between first and second interactions by the first user with a keyboard while typing the first character and the second character within the first sequence of characters, to store, in association with the first data, an indicator of a first context in which the first time interval was determined, to determine, on a second occasion, that a person typed a second sequence of characters including at least the first character followed by the second character, to determine second data that is based at least in part on a second time interval between third and fourth interactions by the person with a keyboard while typing the first character and the second character within the second sequence of characters, to determine that a second context in which the second time interval was determined corresponds to the first context indicated by the stored indicator, to determine, based at least in part on the second context corresponding to the first context indicated by the stored indicator, to compare the second data with the first data to determine whether the person is the first user, and to determine that the person is the first user based at least in part on a comparison of the second data to the first data.

(CRM21) At least one non-transitory computer-readable medium may be configured as described in paragraph (CRM20), and may be further encoded with additional instructions which, when executed by the at least one processor, further cause the system to determine that the first character and the second character in the first sequence of characters were both included in a first word typed by the first user, and to determine, based at least in part on the first character and the second character in the first sequence of characters both being included in the first word, that the first context corresponds to inclusion of the first character and the second character in the first word.

(CRM22) At least one non-transitory computer-readable medium may be configured as described in paragraph (CRM20) or paragraph (CRM21), and may be further encoded with additional instructions which, when executed by the at least one processor, further cause the system to determine at least one characteristic of the keyboard operated by the first user while typing the first sequence of characters, and to determine that the first context corresponds to the at least one characteristic.

Having thus described several aspects of at least one embodiment, it is to be appreciated that various alterations, modifications, and improvements will readily occur to those skilled in the art. Such alterations, modifications, and improvements are intended to be part of this disclosure, and are intended to be within the spirit and scope of the disclosure. Accordingly, the foregoing description and drawings are by way of example only.

Various aspects of the present disclosure may be used alone, in combination, or in a variety of arrangements not specifically discussed in the embodiments described in the foregoing and is therefore not limited in this application to the details and arrangement of components set forth in the foregoing description or illustrated in the drawings. For example, aspects described in one embodiment may be combined in any manner with aspects described in other embodiments.

Also, the disclosed aspects may be embodied as a method, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Use of ordinal terms such as "first," "second," "third," etc. in the claims to modify a claim element does not by itself connote any priority, precedence or order of one claim element over another or the temporal order in which acts of a method are performed, but are used merely as labels to distinguish one claimed element having a certain name from another element having a same name (but for use of the ordinal term) to distinguish the claim elements.

Also, the phraseology and terminology used herein is used for the purpose of description and should not be regarded as limiting. The use of "including," "comprising," or "having," "containing," "involving," and variations thereof herein, is meant to encompass the items listed thereafter and equivalents thereof as well as additional items.

What is claimed is:

1. A method, comprising:
   determining, by a computing system on a first occasion, that a first user typed a first sequence of characters including at least a first character followed by a second character;
   determining, by the computing system, first data that is based at least in part on a first time interval between first and second interactions by the first user with a keyboard while typing the first character and the second character within the first sequence of characters;
   determining, by the computing system on a second occasion, that a person typed a second sequence of characters including at least the first character followed by the second character, the second sequence of characters being different than the first sequence of characters;
   determining, by the computing system, second data that is based at least in part on a second time interval between third and fourth interactions by the person with a keyboard while typing the first character and the second character within the second sequence of characters, wherein the first and third interactions are the same type of keyboard interaction and the second and fourth interactions are the same type of keyboard interaction;
   determining, by the computing system, that the person is the first user based at least in part on the first data and the second data;
   storing, by the computing system and in association with the first data, an indicator of a first context in which the first time interval was determined;
   determining, by the computing system, that a second context in which the second time interval was determined corresponds to the first context indicated by the stored indicator;
   determining, based at least in part on the second context corresponding to the first context indicated by the stored indicator, to compare the second data with the first data to determine whether the person is the first user;
   determining that the first character and the second character in the first sequence of characters were both included in a first word typed by the first user; and
   determining, based at least in part on the first character and the second character in the first sequence of characters both being included in the first word, that the first context corresponds to inclusion of the first character and the second character in the first word.

2. The method of claim 1, further comprising:
   prompting the person to enter an authentication credential into a text box to establish that the person is the first user; and
   determining that the person typed the second sequence of characters into the text box.

3. The method of claim 1, wherein:
   determining the first data further comprises determining a first duration of the first time interval based at least in part on a first time at which the first user ceased pressing a first key for the first character while typing the first sequence of characters; and
   determining the second data further comprises determining a second duration of the second time interval based at least in part on a second time at which the person ceased pressing the first key for the first character while typing the second sequence of characters.

4. The method of claim 3, wherein determining the first duration of the first time interval further comprises:
   determining an amount of time that elapsed between a second time at which the first user initially pressed the first key for the first character while typing the first sequence of characters and the first time.

5. The method of claim 3, wherein determining the first duration of the first time interval further comprises:
   determining an amount of time that elapsed between the first time and a second time at which the first user initially pressed a second key for the second character while typing the first sequence of characters.

6. The method of claim 1, further comprising:
   causing, by the computing system, a display screen to present the second sequence of characters before the person types the second sequence of characters.

7. A method, comprising:
determining, by a computing system on a first occasion, that a first user typed a first sequence of characters including at least a first character followed by a second character;
determining, by the computing system, first data that is based at least in part on a first time interval between first and second interactions by the first user with a keyboard while typing the first character and the second character within the first sequence of characters;
determining, by the computing system on a second occasion, that a person typed a second sequence of characters including at least the first character followed by the second character, the second sequence of characters being different than the first sequence of characters;
determining, by the computing system, second data that is based at least in part on a second time interval between third and fourth interactions by the person with a keyboard while typing the first character and the second character within the second sequence of characters, wherein the first and third interactions are the same type of keyboard interaction and the second and fourth interactions are the same type of keyboard interaction;
determining at least one characteristic of the keyboard operated by the first user while typing the first sequence of characters; and
determining that the first context corresponds to the at least one characteristic.

8. A method, comprising:
determining, by a computing system, that a user typed a sequence of characters including at least a first character followed by a second character;
determining, by the computing system, a duration of at least a first time interval measured based at least in part on a first time at which the user ceased pressing a first key for the first character while typing the sequence of characters;
determining, by the computing system, a duration of at least a second time interval measured based at least in part on a second time at which a person released a first key for the first character while typing the sequence of characters;
determining, by the computing system, whether the person is the user based at least in part on the duration of the first and second time interval;
storing, by the computing system and in association with the first data, an indicator of a first context in which the first time interval was determined;
determining, by the computing system, that a second context in which the second time interval was determined corresponds to the first context indicated by the stored indicator;
determining, based at least in part on the second context corresponding to the first context indicated by the stored indicator, to compare the second data with the first data to determine whether the person is the first user;
determining that the first character and the second character in the first sequence of characters were both included in a first word typed by the first user; and
determining, based at least in part on the first character and the second character in the first sequence of characters both being included in the first word, that the first context corresponds to inclusion of the first character and the second character in the first word.

9. The method of claim 8, wherein determining the duration of the first time interval further comprises:
determining an amount of time that elapsed between a second time at which the user initially pressed the first key for the first character while typing the sequence of characters and the first time.

10. The method of claim 8, wherein determining the duration of the first time interval further comprises:
determining an amount of time that elapsed between the first time and a second time at which the user initially pressed a second key for the second character while typing the sequence of characters.

11. The method of claim 8, further comprising:
prompting the user to enter an authentication credential into a text box to authenticate an identity of the user; and
determining that the user typed the sequence of characters into the text box.

12. The method of claim 8, further comprising:
causing, by the computing system, a display screen to present the sequence of characters before the user types the sequence of characters.

13. A system, comprising:
at least one processor; and
at least one computer-readable medium encoded with instructions which, when executed by the at least one processor, cause the system to:
determine, on a first occasion, that a first user typed a first sequence of characters including at least a first character followed by a second character;
determine first data that is based at least in part on a first time interval between first and second interactions by the first user with a keyboard while typing the first character and the second character within the first sequence of characters;
determine, on a second occasion, that a person typed a second sequence of characters including at least the first character followed by the second character, the second sequence of characters being different than the first sequence of characters;
determine second data that is based at least in part on a second time interval between third and fourth interactions by the person with a keyboard while typing the first character and the second character within the second sequence of characters, wherein the first and third interactions are the same type of keyboard interaction and the second and fourth interactions are the same type of keyboard interaction; and
determine that the person is the first user based at least in part on the first data and the second data;
storing an indicator of a first context in which the first time interval was determined;
determining that a second context in which the second time interval was determined corresponds to the first context indicated by the stored indicator;
determining, based at least in part on the second context corresponding to the first context indicated by the stored indicator, to compare the second data with the first data to determine whether the person is the first user;
determining that the first character and the second character in the first sequence of characters were both included in a first word typed by the first user; and
determining, based at least in part on the first character and the second character in the first sequence of characters both being included in the first word, that the first context corresponds to inclusion of the first character and the second character in the first word.

14. The system of claim 13, wherein the at least one computer-readable medium is further encoded with additional instructions which, when executed by the at least one processor, further cause the system to:
   determine the first data at least in part by determining a first duration of the first time interval based at least in part on a first time at which the first user ceased pressing a first key for the first character while typing the first sequence of characters; and
   determine the second data at least in part by determining a second duration of the second time interval based at least in part on a second time at which the person ceased pressing the first key for the first character while typing the second sequence of characters.

15. The system of claim 14, wherein the at least one computer-readable medium is further encoded with additional instructions which, when executed by the at least one processor, further cause the system to determine the first duration of the first time interval at least in part by:
   determining an amount of time that elapsed between a second time at which the first user initially pressed the first key for the first character while typing the first sequence of characters and the first time.

16. The system of claim 14, wherein the at least one computer-readable medium is further encoded with additional instructions which, when executed by the at least one processor, further cause the system to determine the first duration of the first time interval at least in part by:
   determining an amount of time that elapsed between the first time and a second time at which the first user initially pressed a second key for the second character while typing the first sequence of characters.

17. The system of claim 13, wherein the at least one computer-readable medium is further encoded with additional instructions which, when executed by the at least one processor, further cause the system to:
   cause a display screen to present the second sequence of characters before the person types the second sequence of characters.

18. The system of claim 13, wherein the at least one computer-readable medium is further encoded with additional instructions which, when executed by the at least one processor, further cause the system to:
   store, in association with the first data, an indicator of a first context in which the first time interval was determined;
   determine that a second context in which the second time interval was determined corresponds to the first context indicated by the stored indicator; and
   determine, based at least in part on the second context corresponding to the first context indicated by the stored indicator, to compare the second data with the first data to determine whether the person is the first user.

* * * * *